United States Patent [19]

Ohmura

[11] Patent Number: 5,424,807
[45] Date of Patent: Jun. 13, 1995

[54] IMAGE PROCESSING APPARATUS WITH FORGERY PREVENTION SYSTEM

[75] Inventor: Hiroshi Ohmura, Inagi, Japan

[73] Assignee: Canon Kabushiki Kaisha, Tokyo, Japan

[21] Appl. No.: 319,550

[22] Filed: Sep. 27, 1994

Related U.S. Application Data

[63] Continuation of Ser. No. 426,044, Oct. 24, 1989, abandoned.

[30] Foreign Application Priority Data

Oct. 25, 1988 [JP] Japan .................. 63-267198

[51] Int. Cl.⁶ ........................................... G03G 21/00
[52] U.S. Cl. .................. 355/201; 283/902; 380/3; 382/218
[58] Field of Search ........... 283/902; 355/201, 206; 380/3, 4, 5, 54; 382/7, 30, 34

[56] References Cited

U.S. PATENT DOCUMENTS

| | | | |
|---|---|---|---|
| 4,588,286 | 5/1986 | Stockburger | 355/40 |
| 4,723,149 | 2/1988 | Harada | 355/201 |
| 4,901,063 | 2/1990 | Kimura et al. | 340/723 |
| 5,055,834 | 10/1991 | Chiba | 382/7 X |

FOREIGN PATENT DOCUMENTS 229572 11/1985 Japan.
61777 3/1989 Japan.

Primary Examiner—Leo P. Picard
Assistant Examiner—Christopher Horgan
Attorney, Agent, or Firm—Fitzpatrick, Cella, Harper & Scinto

[57] ABSTRACT

The present invention relates to an image processing apparatus and a method therefor for processing an input image and recording it on a recording medium. In particular, a predetermined original is registered in order to prevent bank bills or securities from being forged by color copying so that an original which is determined to be in coincidence with the registered original is subjected to a different processing from a usual processing.

56 Claims, 25 Drawing Sheets

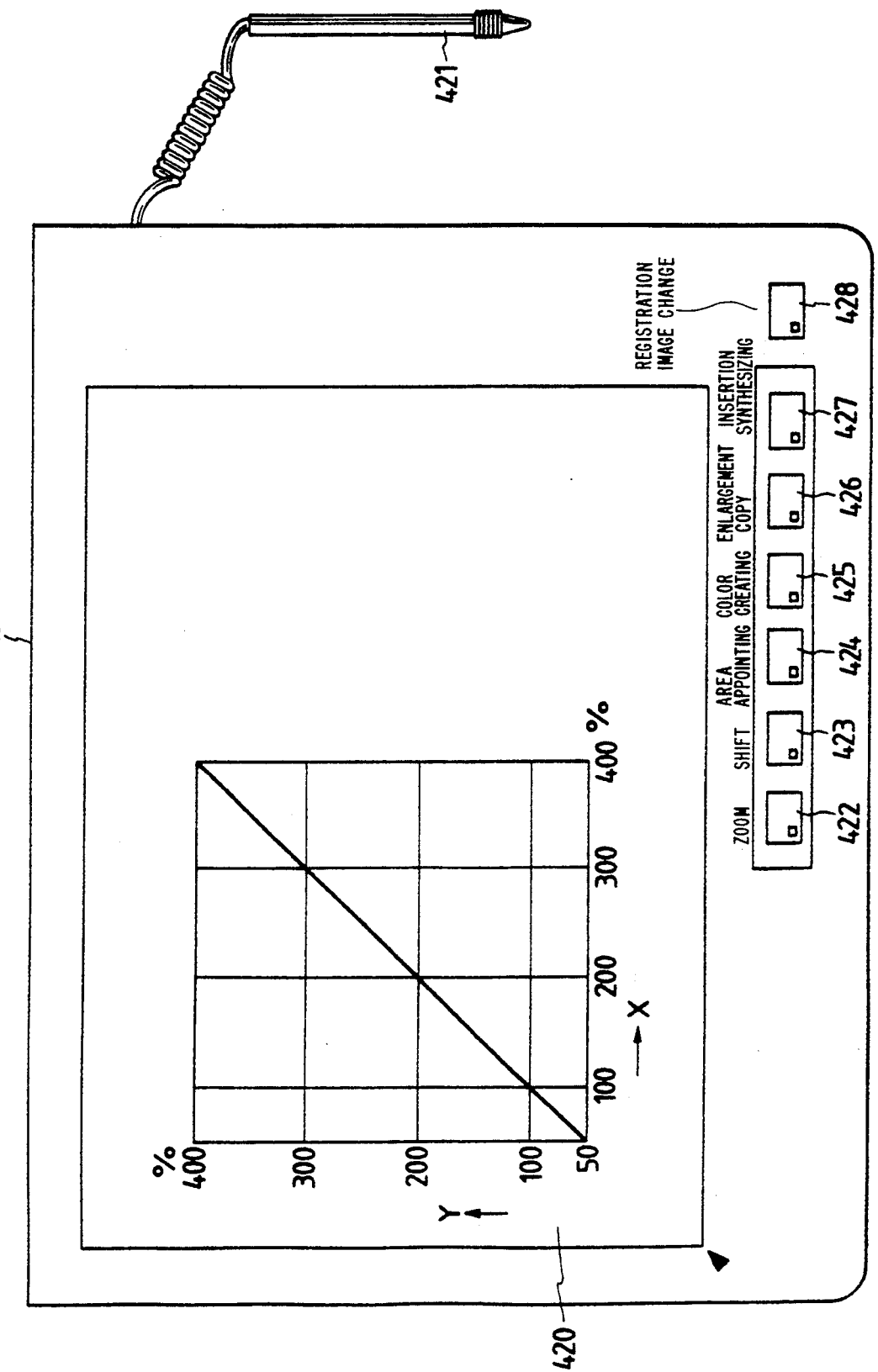

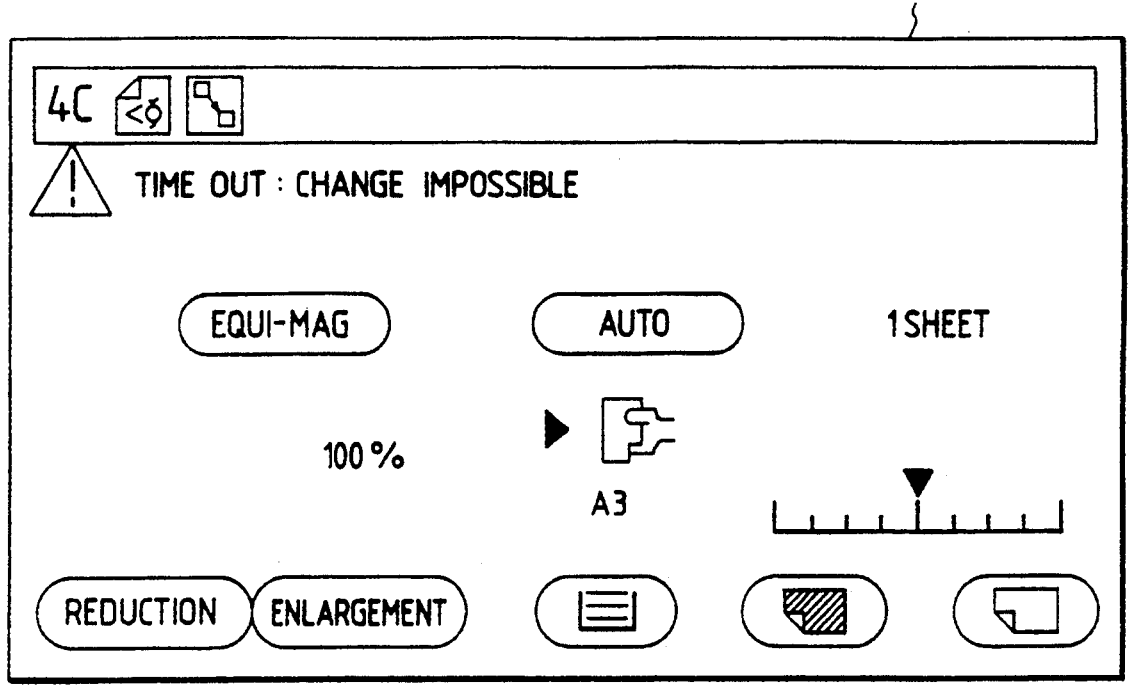

IMAGE PROCESSING APPARATUS WITH FORGERY PREVENTION SYSTEM

This application is a continuation of application Ser. No. 07/426,044, filed Oct. 24, 1989, now abandoned.

BACKGROUND OF THE INVENTION

1. Field of the Invention

The present invention relates to an image processing apparatus such as a copying machine, a facsimile, or the like having a forgery prevention function with which copying of bank bills or the like can be inhibited, and a method therefor.

2. Related Background Art

Hitherto, image copying apparatuses such as copying machines have had for their purpose to faithfully reproduce images of an original placed on the frame thereof by reading the same as required by a user.

Recently, originals of a multiplicity of colors have been extremely faithfully reproduced and recorded as well as the color tones of the originals since digital color copying apparatuses have been developed, the digital color copying apparatuses being constituted by combining a color image apparatus, in which a CCD (charge coupled device) or the like is used, and a digital color printer such as a laser beam printer, an ink jet printer or the like. Therefore, there arises the probability of easily forging paper sheets or documents such as bank bills, bank notes or securities which are inhibited from being copied.

However, the conventional copying apparatuses have not been provided with means to inhibit the copying of bank notes, securities, and important papers. Furthermore, there is no apparatus capable of registering important papers or bank notes as copy-inhibited documents in accordance with the demands of a user so as to inhibit copying or to change the copying action of the apparatus.

This causes a problem in that bank notes or securities which must be inhibited from being copied can be utilized as a new design. Another problem arises in that when the format of an important paper is changed, a ROM in which, for example, inhibited documents are registered must be updated.

In the case where copy inhibited documents can be individually registered, a problem arises in that documents which must be inhibited from being copied can be copied by abusing the structure which is arranged such that the updating and deleting of the registration can be easily conducted. For example, if a copy-inhibited document is registered by a user, data concerning the document can be updated and thereby the document cannot be determined to be a document which is inhibited from being copied by an another person.

SUMMARY OF THE INVENTION

To this end, an object of the present invention is to provide an image processing apparatus capable of freely registering optional paper sheets and documents in accordance with a demand from a user so as to inhibit the copying of them.

In order to achieve the above-described object, there is provided an image processing apparatus comprising input means capable of inputting image data memory means the image data inputted by the input means as reference data means control controls image processings in accordance with the image data inputted by the input means and the reference data stored in the memory means. As result, image data of an original which is desired by, for example, a user to be inhibited from being copied is read so as to be registered in the memory means as the reference data. Then, image data obtained from the reading means during a usual image forming process is subjected to a comparison with the reference data registered in the memory means. If it is determined that the original includes the same pattern as that of the reference data, the image processing is controlled in accordance with the result of the determination.

Another object of the present invention is to provide an image processing apparatus capable of properly controlling the document which is registered as a copy inhibited document.

In order to achieve the above-described object, there is provided an image processing apparatus comprising memory means capable of storing specific reference image data which is used to inhibit forgery control means controls image processing of the input image data on the basis of results of comparison between the reference image data and input image data in order to prevent the input image data from being forged; and change means capable of changing the reference image data.

Other objects of the invention will become more apparent in the detailed description and examples which follow.

BRIEF DESCRIPTION OF THE DRAWINGS

FIG. 13 is a plan view which illustrates an example of the appearance of the digitizer according to the third embodiment of the present invention;

FIGS. 14A to 14K are views which illustrate the indications displayed when a registered image is changed or deleted;

DESCRIPTION OF PREFERRED EMBODIMENTS

Figure 1:
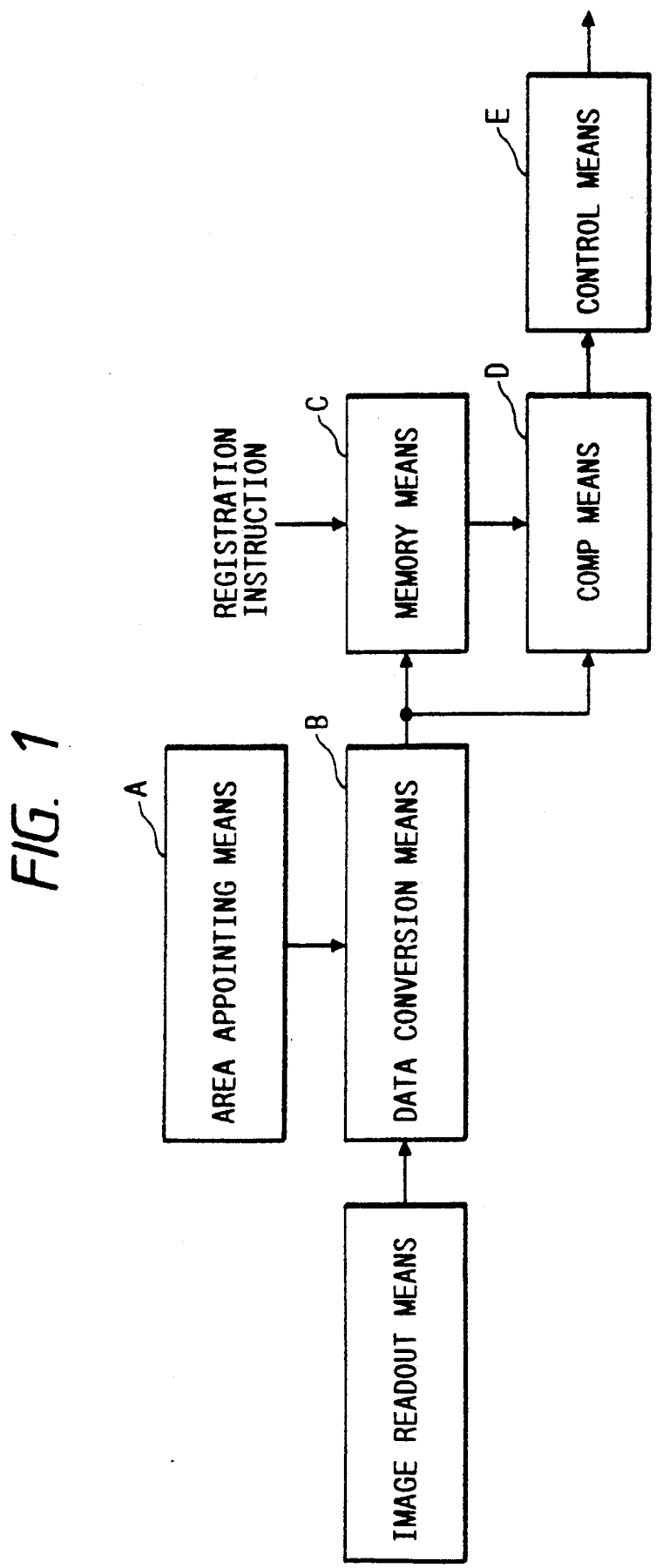
FIG. 1 is a block diagram which illustrates the basic structure of a first embodiment of the present invention.

Referring to the drawings, preferred embodiments of the present invention will now be described in detail.

<First embodiment>

FIG. 1 is a view which illustrates the basic structure of a first embodiment of the present invention. Referring to FIG. 1, symbol A represents area appointing means capable of appointing an optional area of an original image. Symbol B represents data conversion means capable of reading original image data concerning a region appointed by the area appointing means A and converting it into pattern data. Symbol C represents memory means capable of storing pattern data which has been converted by the data conversion means B in accordance with an instruction of registration, the pattern data being registered as reference data. Symbol D represents a comparison means for making a comparison between pattern data obtained from the data conversion means B and reference data stored in the memory means C, the comparison being made when an image is formed. Symbol E represents a control means capable of stopping the image forming processing in accordance with the result of the comparison made by the comparison means D.

Figure 2:
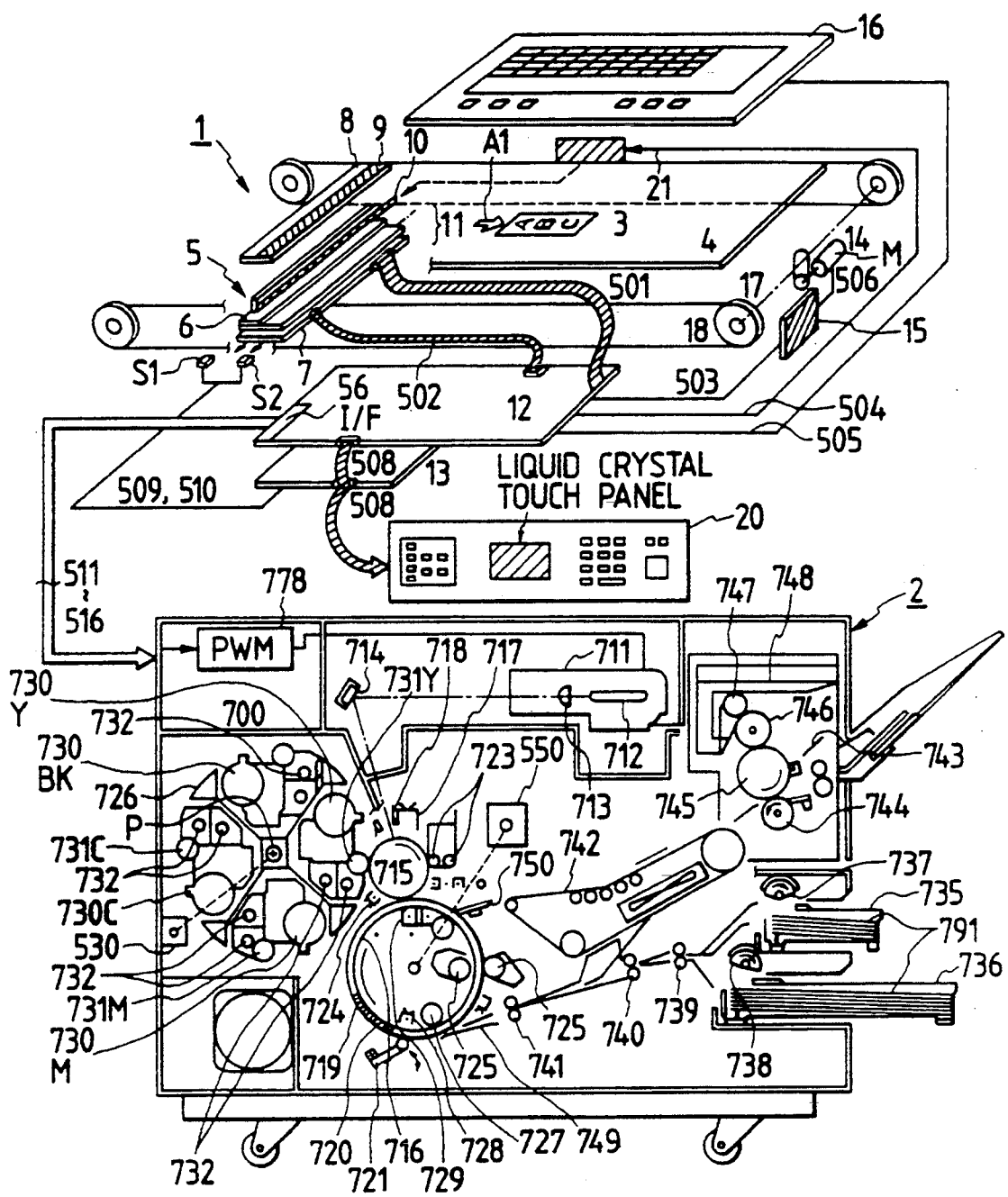
FIG. 2 is a schematic view which illustrates the schematic internal structure of the overall body of the first-/embodiment of the present invention.

FIG. 2 is a schematic view which illustrates the schematic internal structure of the first embodiment of a digital color copying apparatus of the present invention. The apparatus according to this embodiment comprises digital color image readout means (abbreviated to "color reader" hereinafter) 1 in the upper portion thereof, and a digital color image printing apparatus (abbreviated to "color printer" hereinafter) 2 in the lower portion thereof. The color reader 1 reads color image information of an original in accordance with colors by color decomposing means and photoelectric conversion elements such as CCDs (charge coupled devices) so as to convert it into an electric digital image signal. The color printer 2 is an electronic photograph type (or electrophotographic type) laser beam color printer capable of reproducing the color images in accordance with colors in response to the digital image signal, and recording it by transcribing it with digital dots on a recording paper sheet.

First, the color printer 1 will be schematically described.

Reference numeral 3 represents an original, 4 represents a platen glass on which the original 3 is placed, and 5 represents a rod array lens capable of converging an optical image reflected by the original 3 which has been exposed and scanned by an exposing lamp 10 and of inputting the optical image into an equivalent magnification full color sensor 6. Reference numeral 7 represents a sensor output signal amplifying circuit. These elements 5, 6, 7, and 10 integrally constitute an original scanning unit 11 which exposes and scans the original 3 in the direction designated by an arrow A1.

The color-decomposing color image signals read for each of the lines as a result of the exposure and scanning are amplified up to a predetermined voltage level by the sensor output signal amplifying circuit 7, and are supplied, through a signal line 501, to a video processing unit 12 in which the signals are processed. The signal line 501 is a coaxial cable capable of enabling reliable signal transmission. Reference numeral 502 represents another signal line through which pulses for driving the equivalent magnification full color sensor 6 are supplied, all of the drive pulses being generated in the video processing unit 12.

Reference numerals 8 and 9 represent a white plate and a black plate with which the white level and the black level of the image signal are compensated (or corrected) in such a manner that the white and black plates 8 and 9 are radiated with a halogen exposure lamp 10 so as to obtain a signal level of a predetermined density from the equivalent magnification full color sensor 6, the thus obtained signal level being used for the white and black level compensations (or correction).

Reference numeral 13 represents a control unit (a controller) including a microcomputer. The control unit 13 controls all of the operations performed in the color reader portion 1. The control unit 13 controls the display action on the operation panel 20, the key input through the same, and the operation of the video processing unit 12 through a bus 508. The controller 13 causes position sensors S1 and S2 to detect the position of the original scanning unit 11 through signal means 509 and 510. Furthermore, it controls, through a signal line 503, a stepping motor drive circuit 15 capable of pulse-operating the stepping motor 14 through signal line 506 which is capable of moving the original operation unit 11 by pollysystem 17 and 18. The controller 13 further controls the actuation and the quantity of light of the halogen exposure lamp 10 through a signal line 504 by using an exposure lamp driver. It further controls, through a signal line (bus) 505, the digitizer 16, the operations of the internal keys, and the operation of the display portion.

The color image signal read by the original scanning unit 11, when the original is exposed and scanned, is supplied to the video processing unit 12 via the amplifying circuit 7 and the signal line 501 in which it is subjected to a variety of processing before being transmitted to the color printer 2 through an interface circuit 56 via signal lines 511 and 516.

The color printer 2 will now be schematically described.

Reference numeral 711 represents a scanner comprising a laser output portion (omitted from illustration)

capable of converting the image signal supplied from the color reader 1 via PVM 778 (located in compartment 700) into an optical signal, a polygon (for example, an octahedron) mirror 712, a motor (omitted from illustration) capable of rotating the mirror 712, and an F/θ lens (imaging lens) 713. Reference numeral 714 represents a reflection mirror capable of changing the optical passage through which laser beams pass, and 715 represents a photosensitive drum. The laser beam emitted from the laser output portion is reflected by the polygon mirror 712, and then it passes through the lens 713 and the mirror 714 before linearly scanning (raster scanning) the surface of the photosensitive drum 715. As a result, a latent image which corresponds to the original image is formed.

Reference numeral 717 represents a primary charger, 718 represents a full exposing lamp, 723 represents a cleaner portion capable of recovering toner left from the transcribing action, and 724 represents a pre-transcribing charger, these elements being disposed around the photosensitive drum 715.

Reference numeral 726 represents a development unit capable of developing the static latent image formed on the surface of the photosensitive drum 715 due to the exposure conducted with the laser. Symbols 731Y, 731M, 731C, and 731BK represent development sleeves capable of conducting a direct development with being positioned in contact with the photosensitive drum 715. Symbols 730Y, 730M, 730C, and 730BK represent toner hoppers in which spare toner is accommodated. Reference numeral 732 represents a screw capable of conveying the developer. Thus, the development unit 726 is constituted by the above-described sleeves 731Y to 731BK, the toner hoppers 730Y to 730BK, and the screw 732, these elements being disposed around a rotational axis P of the development unit 726. When, for example, an yellow toner image is formed, the yellow toner imaging is conducted with the elements positioned as illustrated. When a magenta toner image is formed, the development unit 726 is rotated relative to the axis P so as to bring the development sleeve 731M in the magenta development device into contact with the photosensitive drum 715. A cyanic toner image and a black toner image are formed similarly.

Reference numeral 716 represents a transcribing drum capable of transcribing a toner image formed on the photosensitive drum 715 on a paper sheet. Reference numeral 719 represents an actuator plate capable of detecting the position of the transcribing drum 716 after its movement, and 720 represents a position sensor capable of detecting a fact that the transcribing drum 716 has moved to its home position, the detection being conducted by allowing the position sensor 720 to come up to the actuator plate 719. Reference numeral 725 represents a transcribing-drum cleaner, 727 represents a paper holding roller, 728 represents a discharger, and 729 represents a transcribing charger. These elements 719, 720, 725, 727, and 729 are disposed around the transcribing roller 716.

Reference numerals 735 and 736 represent paper supply cassettes for accommodating paper (paper sheets) 791, 737 and 738 represent paper supply rollers capable of supplying paper from the paper supply cassettes, 739, 740, and 741 represent timing rollers capable of arranging the timing of the paper supply and conveyance actions. The paper sheet which has passed through these elements 735 to 741 is guided by a paper guide 749 which is held by a clipper 721 at the front portion thereof. It is then wound to the transcribing drum 716 before being shifted to an image forming process.

Reference numeral 550 represents a drum-rotating motor which is capable of synchronously rotating the photosensitive drum 715 and the transcribing drum 716. Reference numeral 750 represents a scraping claw for removing the paper sheet from surface of the transcribing drum 716 after the image forming process has been completed. Reference numeral 742 represents a conveyance belt capable of conveying the paper sheet thus removed, and 743 represents an image fixing portion in which the paper sheet conveyed by the conveyance belt 742 is fixed. The image fixing portion 743 includes a pair of thermal pressure rollers 744 and 745.

In the image fixing portion 743, rotational force of a motor 747, which is mounted on a motor force of a motor 747, which is mounted on a motor mounting unit 748 is transmitted to the pair of thermal pressure rollers 744 and through transmission gear 746, so as to fix an image on a paper fed between thermal pressure rollers 744 and 745.

Figure 3:
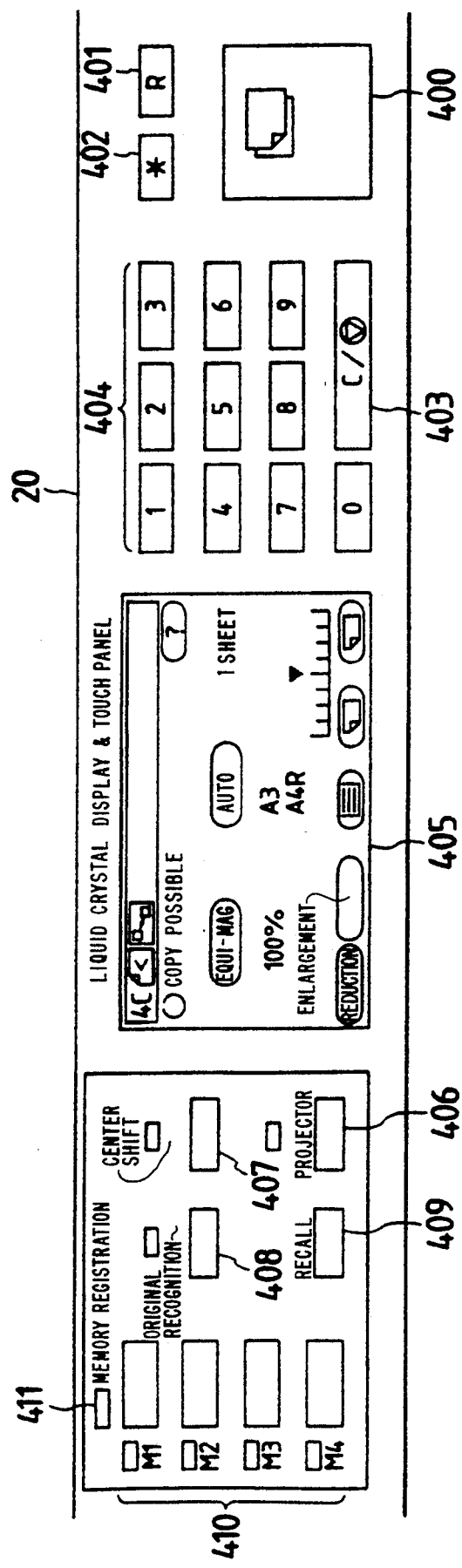
FIG. 3 is a plan view which illustrates an example of the appearance of the operation panel shown in FIG. 2.

FIG. 3 is a view which illustrates the operation panel 20 of the color copying apparatus in detail. Referring to FIG. 3, reference numeral 400 represents a copy start key (a copy button) for instructing copying operation to start, 401 represents a reset key with which the present mode is returned to the standard mode, 402 represents an enter key with which a registration mode or a service mode is instructed, 404 represents a ten-key for use when numerals such as the instructed numbers of the number of the paper sheets are inputted, and 403 represents a clear/stop key for use when the inputted numeral is desired to be cleared or when the operation is intended to be stopped during a continuous copying operation. Reference numeral 405 represents a liquid crystal display and a touch panel for instructing a mode and displaying a state of the printer 2.

Reference numeral 407 represents a center shift key, and 408 represents an original recognition key capable of automatically detecting the size and the position of the original at the copying action. Reference numeral 406 represents a projector key with which a projector mode is specified, 409 represents a recall key with which the previous copy state is restored, 410 represents memory keys (M1, M2, M3, and M4) with which the specified value previously programmed for each of the modes is stored or accessed, and 411 represents a registration key for each of the memories.

Figure 4:
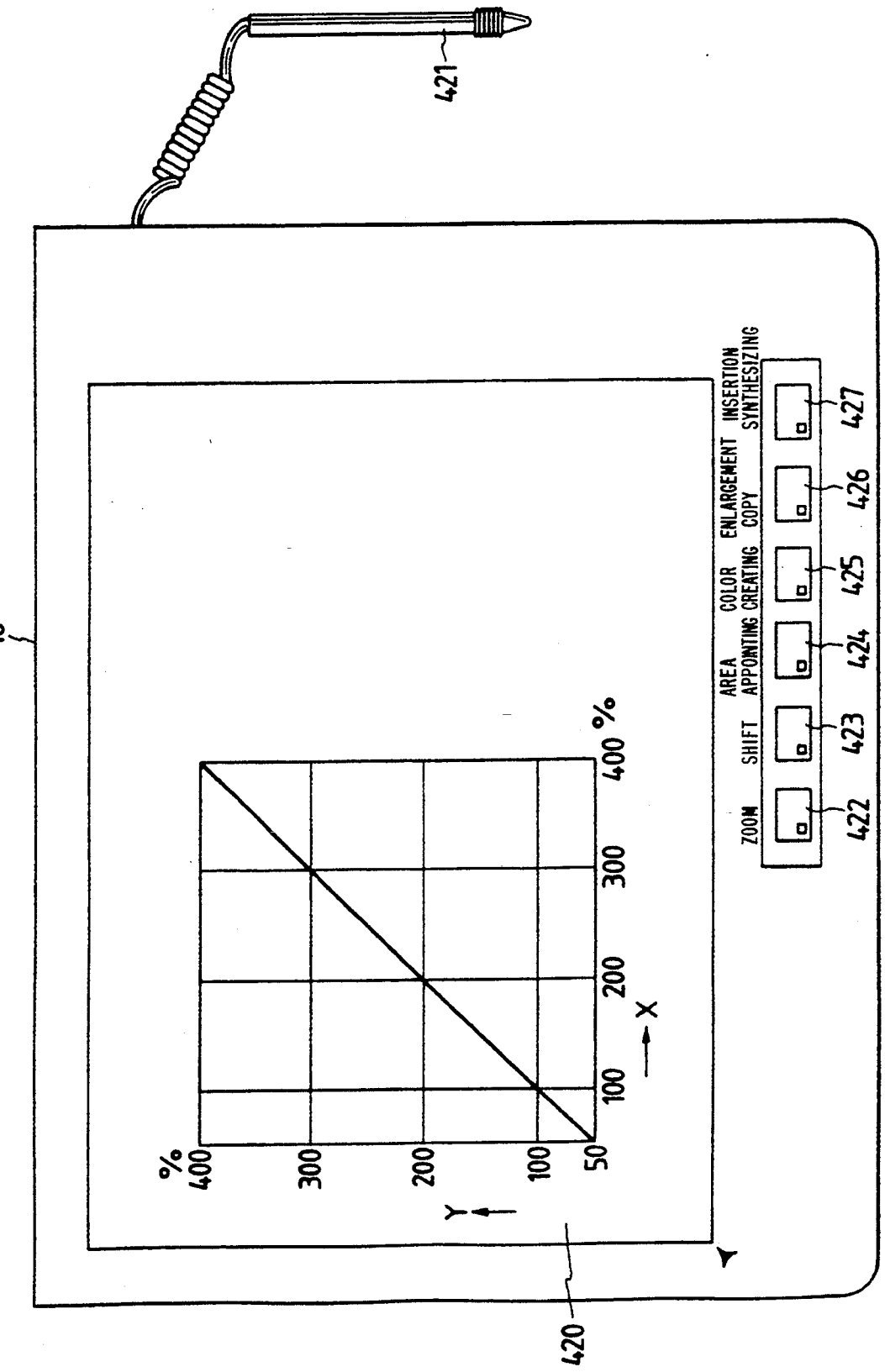
FIG. 4 is a plan view which illustrates an example of the appearance of the digitizer shown in FIG. 2.

FIG. 4 is a view which illustrates the appearance of the digitizer 16 for use as an example of an apparatus capable of appointing an area. Referring to FIG. 4, reference numeral 422 represents a zoom key, 423 represents a shift key, 424 represents an area appointing key, 425 represents a color create key, 426 represents an enlargement copy key, and 427 represents an insertion synthesizing key. The above-described keys 422, 423, 424, 425, 426, and 427 are entry keys with which a mode is specified. Reference numeral 420 represents a coordinate detection plate (a coordinate position detection plate) with which an optional area on the original is appointed or a magnification is specified. Reference numeral 421 represents a point pen for specifying a coordinate on the coordinate detection plate 420. Information from the states of the keys 422 to 427 and coordinate detection plate 420 and information about coordinate are inputted, via a bus 505 shown in FIG. 2, stored in a RAM (Random Access Memory) in the control unit 13 by the CPU (microcomputer) in the control unit 13.

When a processing area on the original is instructed by a user, the area appointing key 424 is first depressed. When the area appointing key 424 is depressed, an area appointing mode is started in which one or more areas can be appointed on the original, an optional mode selected from a trimming mode, a masking mode, an image separation mode, and a copy inhibition registration mode is instructed in each of the appointed areas. The former three modes are not directly concerned to the present invention and description of these modes are omitted. Herein, below the copy inhibition registration mode which is the essential portion of the present invention will be described.

Figure 6:
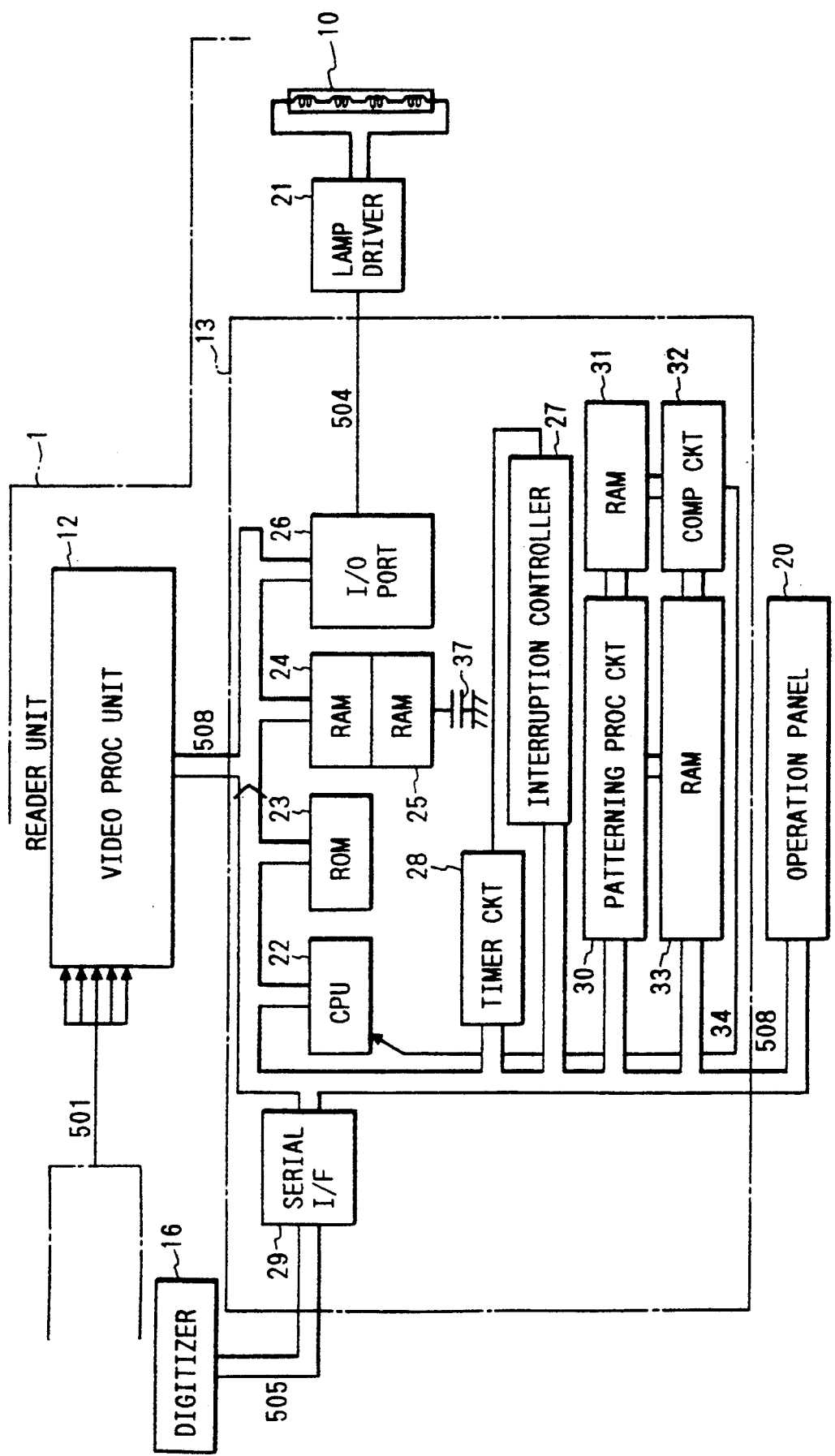
FIG. 6 is a block diagram which illustrates the structure of a circuit for use in the control unit shown in FIG. 2.

In the copy inhibition registration mode, an image within an area instructed with the point pen 421 is read so as to be stored in the RAM 31 shown in FIG. 6 in the control unit 13 after it has been patterned. The data thus stored in the RAM 31 is made a reference pattern so that any copying cannot be conducted if it is determined that a subject pattern is similar to this reference pattern at the time of the copying action.

Figure 5:
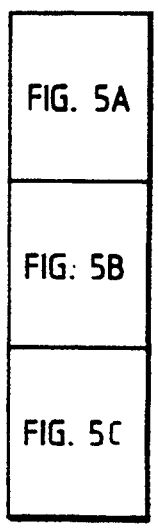
FIGS. 5, 5A, 5B and 5C are plan views which illustrate examples of the indications displayed on the display frame when copy inhibition is registered in accordance with the first embodiment of the present invention.
Figure 5A:
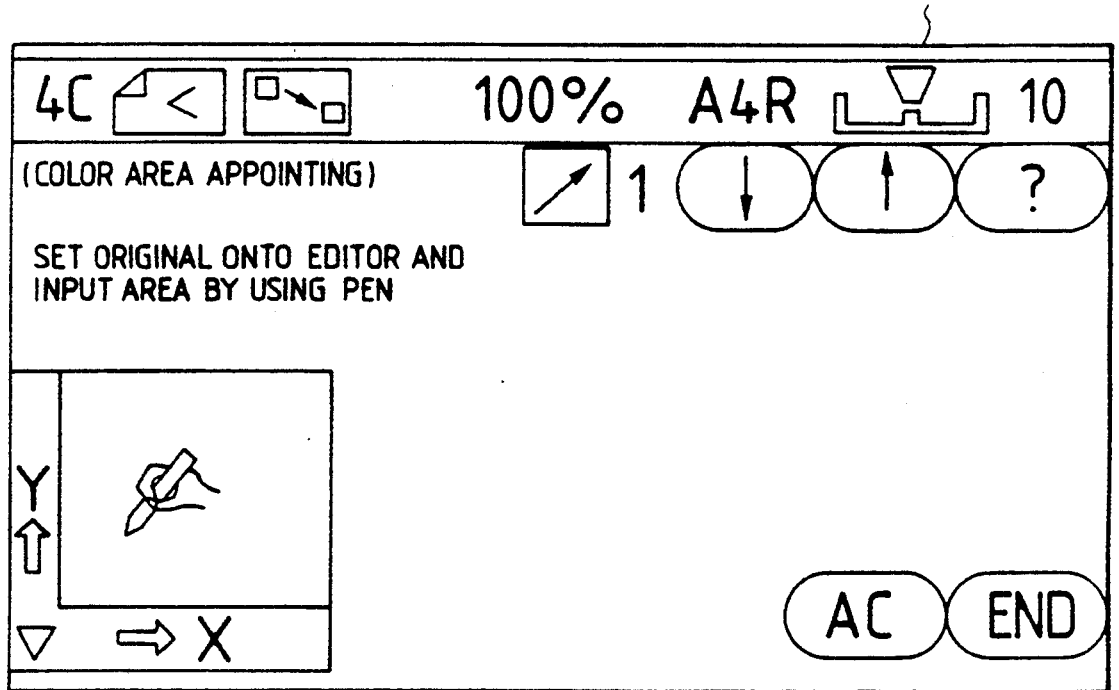
Figure 5B:
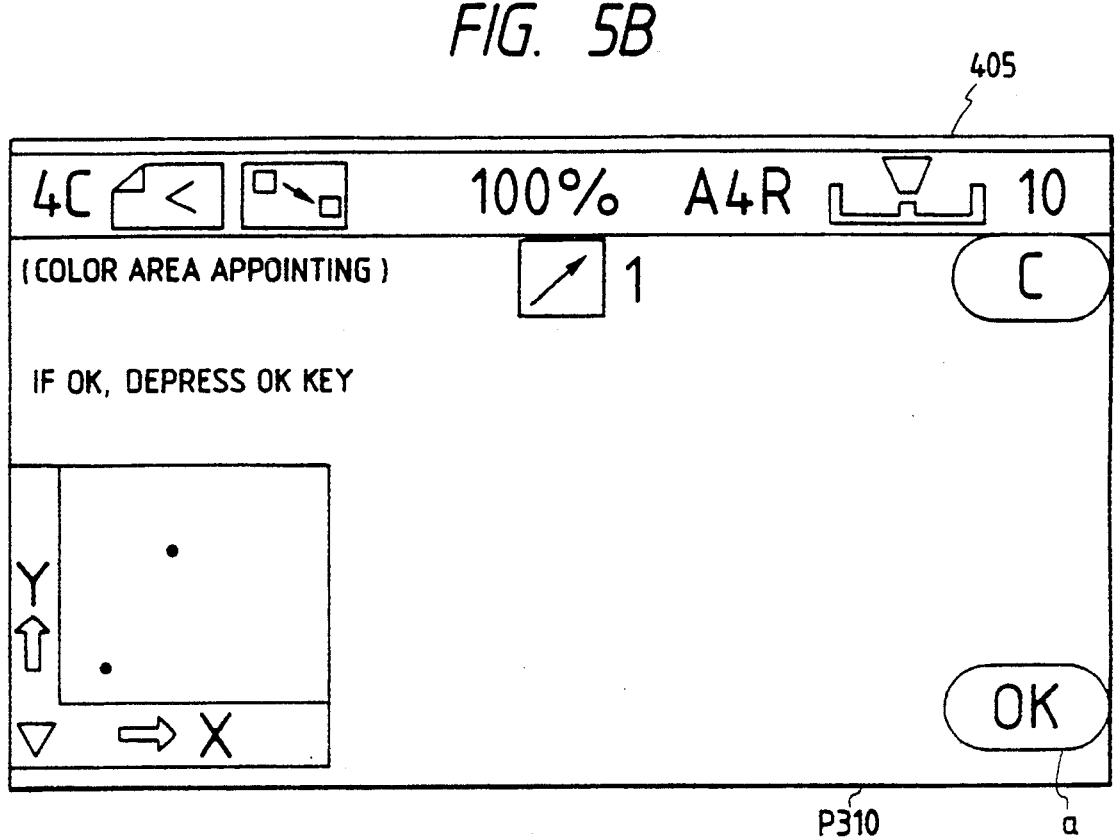
Figure 5C:
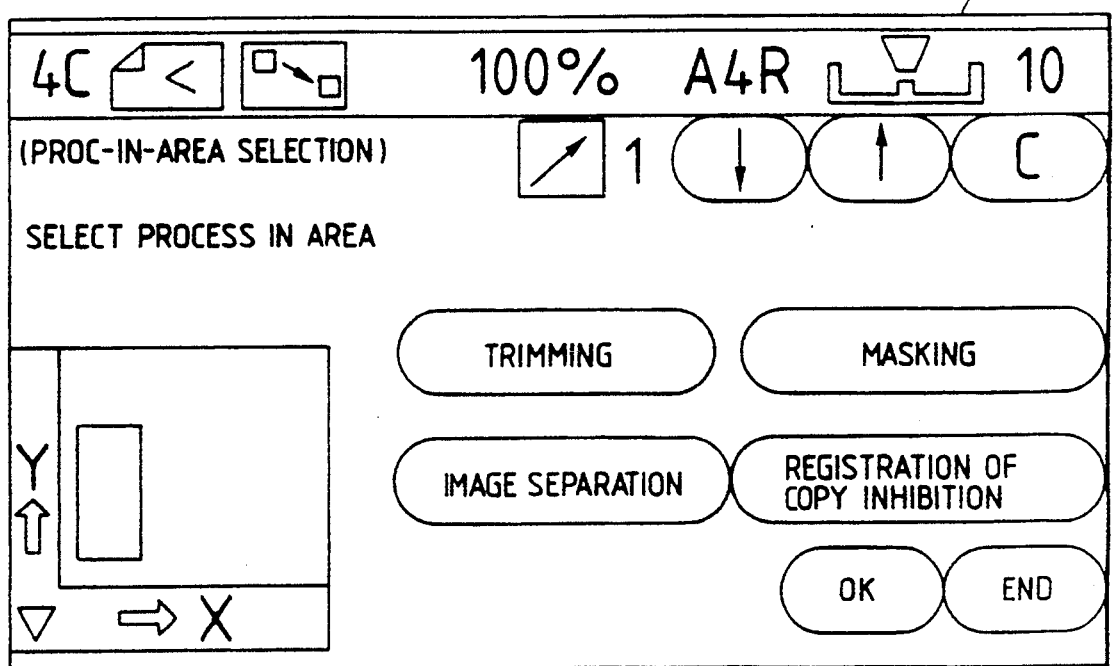

Then, a specific operation procedure in the copy inhibition registration mode will be described with reference to FIGS. 5A–5C.

When the area appointing key 424 on the digitizer 16 is depressed, the display on the liquid crystal display 405 equipped with a panel key on the operation panel 20 is replaced by an image P300. In accordance with the display of this image P300, an original is placed by a user on the coordinate detection plate (editor) of the digitizer 16, and an area is instructed with the point pen 421.

When two points in the area are depressed, the display on the liquid crystal display 405 is replaced by an image P310. In accordance with the display of this image P310, if it is determined by the user that the appointed area is agreeable, the user depresses the touch key (an OK key) a on the image P310. When this touch key a is depressed, the display on the liquid crystal display 405 is replaced by an image P320.

Then, the user selects a processing from the displayed processings, that is, the trimming, the masking, the image separation, and the copy inhibition registration for the appointed area, and a key corresponding to the result of the selection is depressed.

If the copy inhibition registration mode is instructed by the user, the display on the liquid crystal display 405 is returned to the image P300, and then the area appointing is conducted.

After all of the appointments of the areas to be registered to be inhibited from being copied have been completed by repeating the above-described processings, the user needs to place the original on the platen glass (copying frame) shown in FIG. 2 and to depress the copy button 400. (FIG. 3) As a result, a reference pattern for the copy-inhibited original is registered in the RAM in the control unit 13 as described later.

Figure 7:
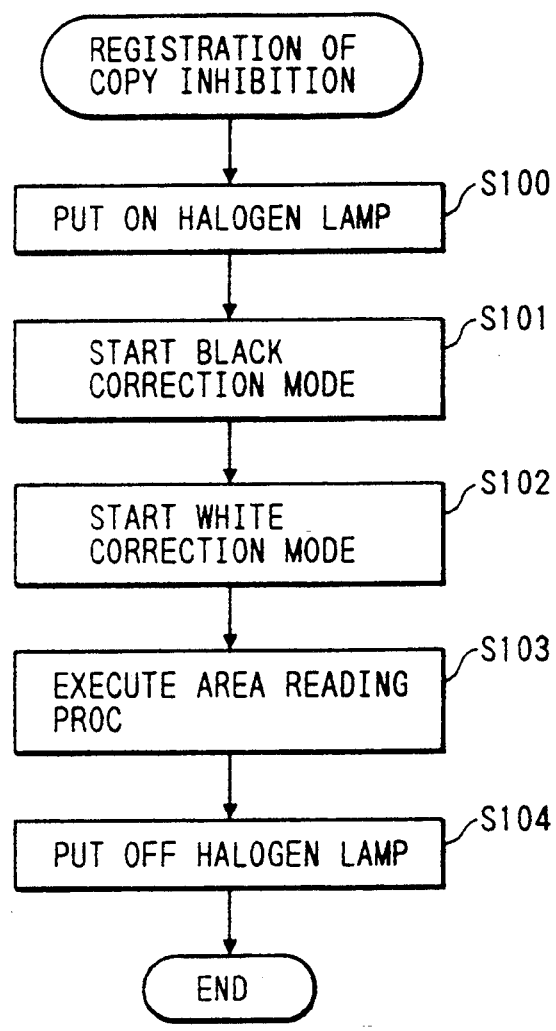
FIG. 7 is a flow chart which illustrates the procedure of controlling the copy inhibition registration according to the first embodiment of the present invention.

FIG. 6 is a view which illustrates the structure of a circuit for use in the control unit shown in FIG. 2. Referring to FIG. 6, reference numeral 22 represents a CPU (Central Processing Unit) performing a control action according to the present invention as shown in FIG. 7. Reference numeral 23 represents a ROM (Read Only Memory) in which the control procedure and constants are previously stored, and reference numerals 24 and 25 represent RAMs (Random Access Memory) to serve as working regions for the CPU 22. Reference numeral 26 represents an I/O (Input and Output port) through which a control signal is transmitted from the CPU 22 to a dimmer lamp driver 21 which is capable of actuating the halogen exposing lamp 10. Reference numeral 29 represents a serial interface (I/F) with which data is transmitted/received with the digitizer 16. Reference numeral 27 represents an interruption controller, and reference numeral 28 represents a timer circuit. Reference numeral 37 represents a power source for backup of the RAM 25.

Reference numeral 30 represents a patterning circuit capable of patterning data in the appointed area by binarization or the like. Reference numeral 31 represents a registering RAM capable of storing data patterned by the patterning circuit 30 as reference data (a reference patterned data) when the present mode is the copy inhibition registration mode. Reference numeral 33 represents a comparison RAM capable of storing data patterned by the patterning circuit 30 the pre-scan time in a usual copy mode reference numeral, 32 represents a comparison circuit capable of making comparison between the patterned original data stored in the RAM 33 and the reference data so as to determine the correlation therebetween. A control signal representing a determination that there is a correlation and transmitted from the comparison circuit 32 is supplied to the CPU 22 through the signal line 34. The above-described elements 22 to 23, the video processing unit, and the operation panel 20 are connected to one another through the bus 508.

FIG. 7 is a flowchart which illustrates a control procedure of the above-described copy inhibition registration action performed by the CPU 22 in the control unit 13.

In accordance with the depressing of the copy button 400 (FIG. 3), the halogen exposing lamp 10 is turned on in step S100. Then, the black level compensation is conducted in the next step S101. Then, the white level compensation is conducted in step S102. Since these processings are not the essential portion of the present invention, the description concerning these proccessings is omitted here.

Then, the flow advances to step S103 in which a mode for reading the area previously appointed by the digitizer 16 is started. In this mode, image data which has been subjected to the black level compensation and white level compensation by the video processing unit 12 shown in FIG. 6 is transmitted to the patterning circuit 30 shown in FIG. 6 via the bus 508. The patterning circuit 30 conducts, for example, a binarization. Thus, data after subjected to the binarization is stored in the RAM 31 shown in FIG. 6 as reference data. Then, the halogen exposing lamp 10 is turned off in step S104, and thus the registration processing is ended.

Figure 8:
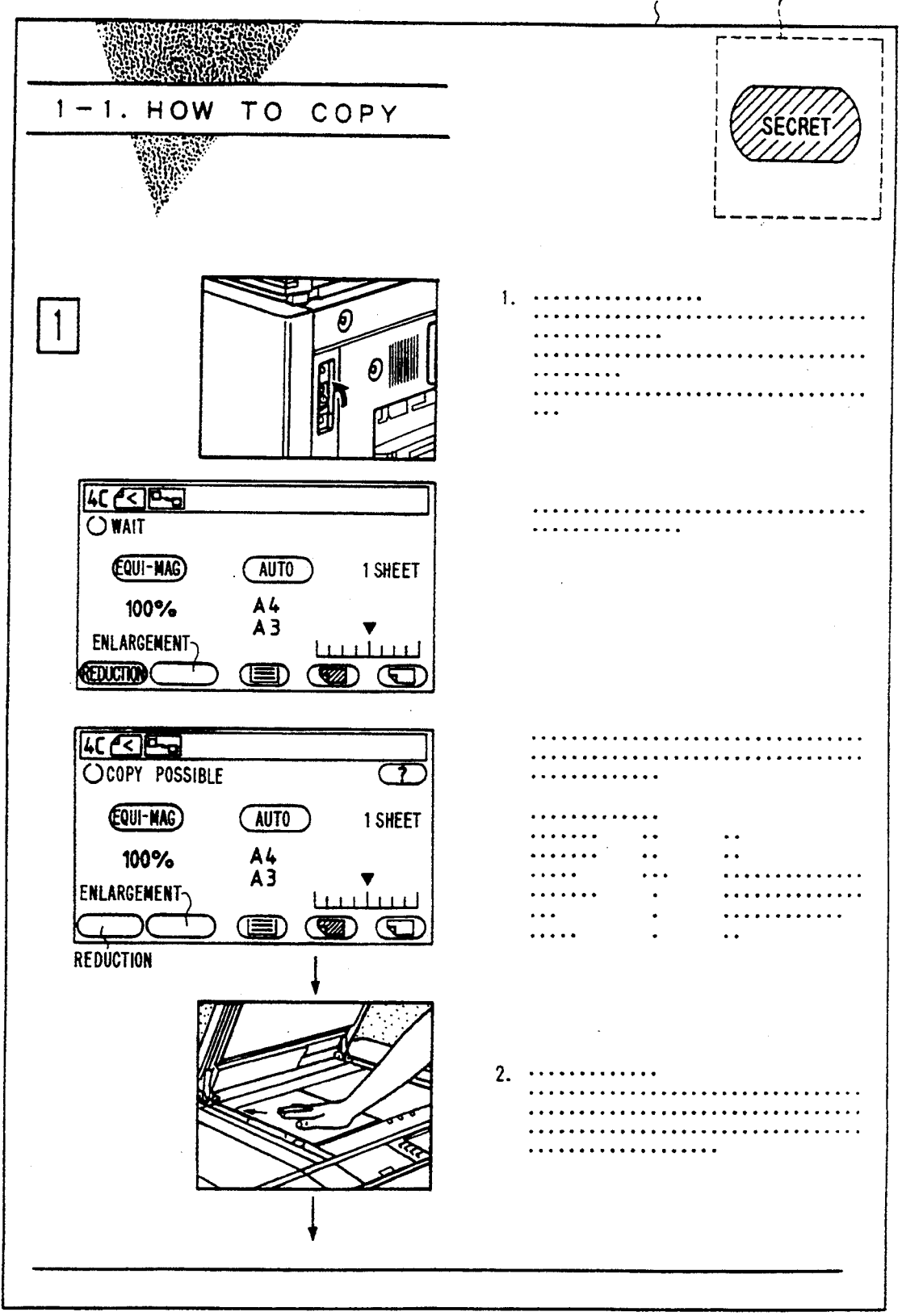
FIG. 8 is a plan view which illustrates a document which will be registered to be inhibited from being copied and a registration area.

Then, the area to be registered by a user will be specifically described. As shown in FIG. 8, if a document in which a SECRET mark is written is inhibited from being copied, it is necessary for a frame written by a dashed line as designated by symbol A shown in FIG. 8 to be instructed by using the point pen 421 so as to make this area (A) to be stored in the above-described RAM 31 as a reference data. The area designated by the dashed line shown in FIG. 8 represents a fact that letters are written.

In the normal copying state, image data of the original is transmitted to the pattern processing circuit 30 at the pre-scanning time, the image data thus transmitted being then binarized similarly to the description above so as to be stored in the RAM 33.

The patterned data about the original thus stored in the RAM 33 is transmitted to the comparison circuit 32 in which it is subjected to a comparison with the reference data (reference patterned data) previously stored in the RAM 31. In order to make the comparison above, for example, value L in the following equation (1) is used:

$$L = \sum_{i=1}^{n} \sum_{j=1}^{m} x_{ij} X_{(p+i)(q+j)} \quad (1)$$

where
i, j: pixel number
n, m: the number of pixels in the reference patterned data
p, q: the number of shiftings
xij: the value of reference patterned data at (i, j)
Xij: the value of patterned original at (i,j)
If the value obtained from the comparison holds the following relationship:

$$L > L_{th} \quad (2)$$

where symbols Lth is a threshold value, the comparison circuit 32 determines that the patterned original data includes the same pattern as the reference pattern. As a result, the comparison circuit 32 transmits a control signal (copy-inhibition control signal) to the CPU 22 through the signal line 34.

Figure 9:
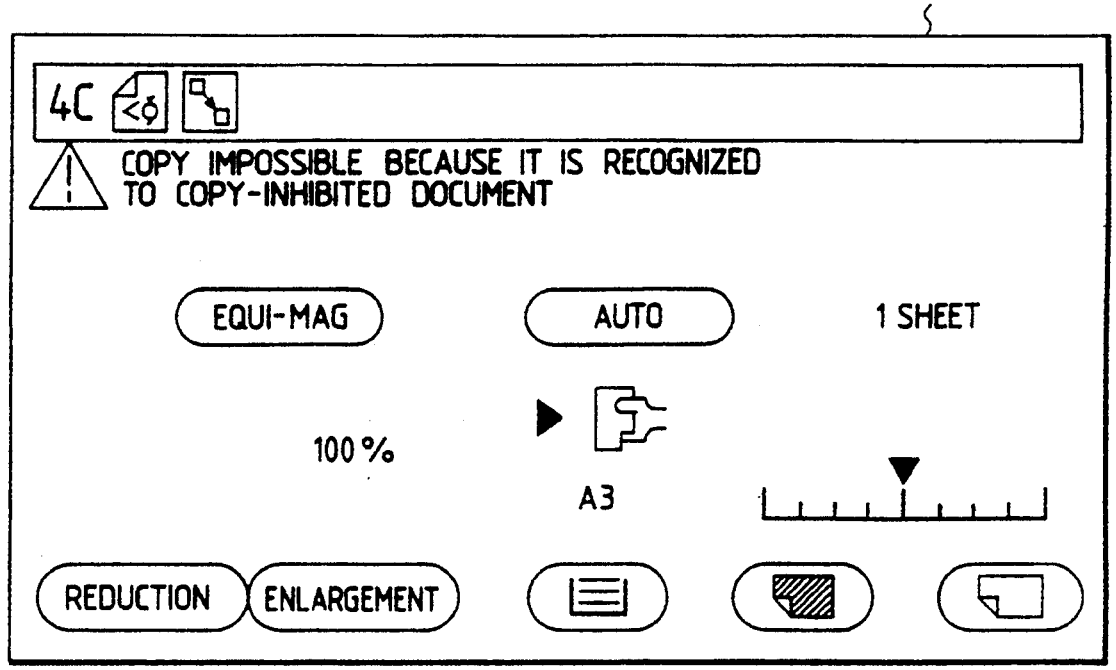
FIG. 9 is a plan view which illustrates an example of an indication displayed on the display frame when it is determined that the subject document is inhibited from being copied according to the first embodiment of the preset invention.

The CPU 22 which has received the copy-inhibition control signal is stopped the copying action, and causes the display 405 of the operation panel 20 to display a message as shown in FIG. 9 so as to notify the user that the copy is inhibited.

If the value L obtained from the calculation by using the Equation (1) holds the following relationship:

$$L \leq L_{th} \quad (3)$$

The comparison circuit 32 determines that there is no same pattern as the reference pattern in the patterned original data so that it does not transmit the copy-inhibition control signal to the CPU 22. As a result, the CPU 22 performs a normal copying action.

As described above and according to this embodiment, since the images which must be inhibited from being forged, for example, bank bills or securities can be inputted by image input means which is used for a normal copying operation, the registration or change in the image which must be inhibited from being forged can be extremely readily conducted.

<Second embodiment>

Figure 10:
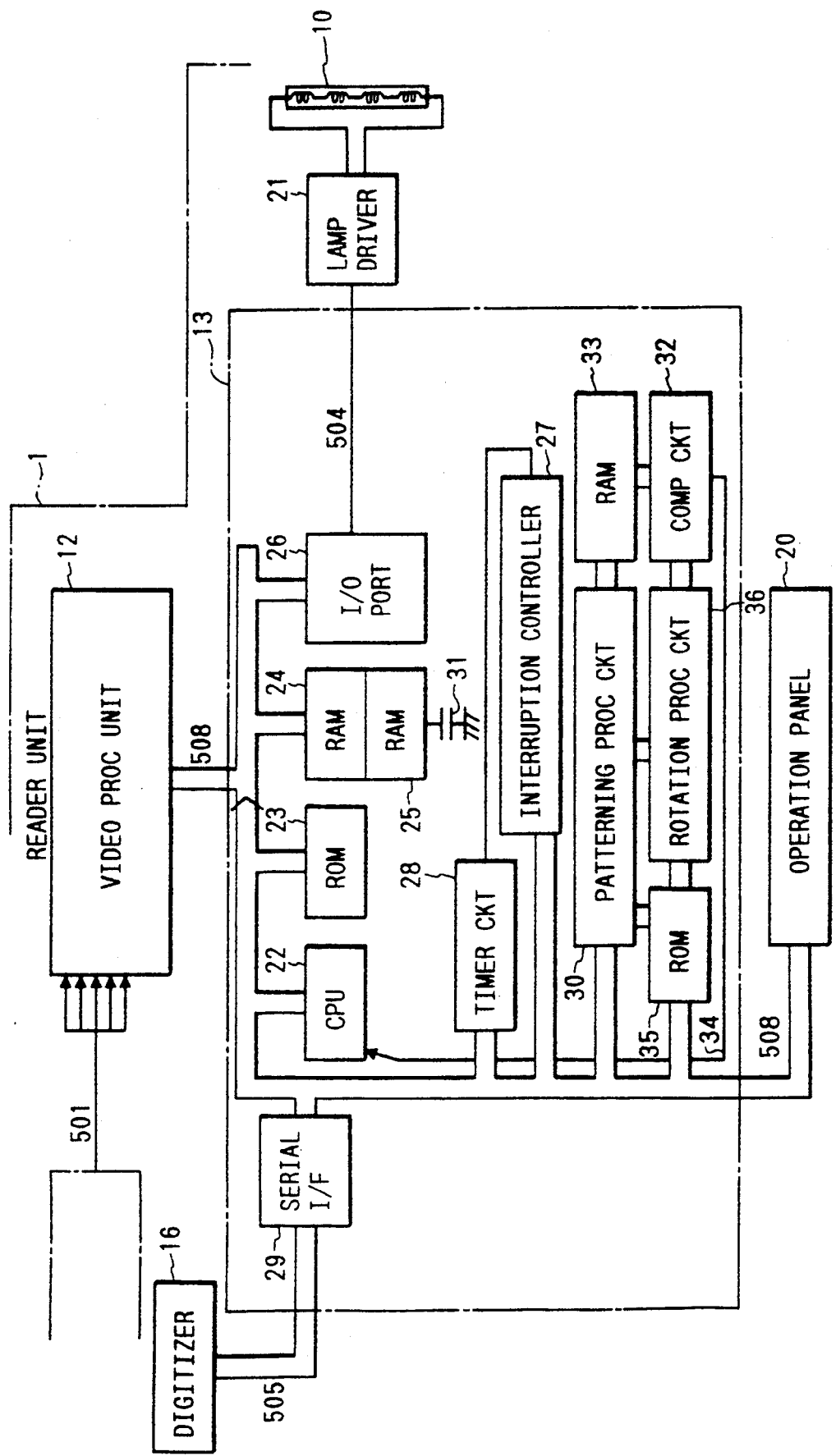
FIG. 10 is a block diagram which illustrates the structure of a circuit for use in a control unit according to a second embodiment.

FIG. 10 is a view which illustrates the structure of a circuit for use in a second embodiment of the present invention. The control unit according to this embodiment comprises a ROM 35 capable of registering reference patterned data (reference data) which has been patterned at the time of the copy inhibition registration mode, and a rotary processing circuit 36 capable of rotating the reference data in the ROM 35. The other structures are the same as those according to the embodiment shown in FIG. 6.

According to the embodiment shown in FIG. 10, reference data about bank bills, securities, or the like is previously written in the ROM 35 which cannot be deleted at the delivery from a manufacturing plant. The reference data which has been patterned is, for example, trinary data (or ternary data) expressed by the following Equation (4):

$$Y_{ij} = \begin{cases} Y_0 & (\text{if } Y_{ij}' < Y_0) \\ Y_1 & (\text{if } Y_0 \leq Y_{ij}' < Y_1) \\ Y_2 & (\text{if } Y_1 < Y_{ij}') \end{cases} \quad (4)$$

where
YiJ: converted data at (i,j)
Y'ij: data read from an original at (i,j)
Y0, Y1, Y2: constant Since data described above is written in the ROM 35, it cannot be changed or deleted. Therefore, forgery of bank bills or securities can be prevented by converting data about the bank bills or the securities into data expressed by Equation (4) by the pattern processing circuit 30 and by writing the data thus converted.

In a normal copying action, image data concerning the original is transmitted to the pattern processing circuit 30 at the pre-scan time, a trinary processing is conducted similarly to the above-described case, and is stored in the RAM 33.

Then, patterned data about the original stored in the RAM 33 is transmitted to the comparison circuit 32. Simultaneously, the reference data stored in the ROM 35 is transmitted to the rotary processing circuit 36 at which data rotated by an angular degree of θ is processed so as to be transmitted to the comparison circuit 32 at which it is subjected to a comparison made with the above-described patterned original data. This rotary processing is conducted in accordance with, for example, following Equation (5):

$$Y_{ij}' = \begin{pmatrix} \cos\theta & \sin\theta \\ \sin\theta & -\cos\theta \end{pmatrix} Y_{ij} \quad (5)$$

Figure 11:
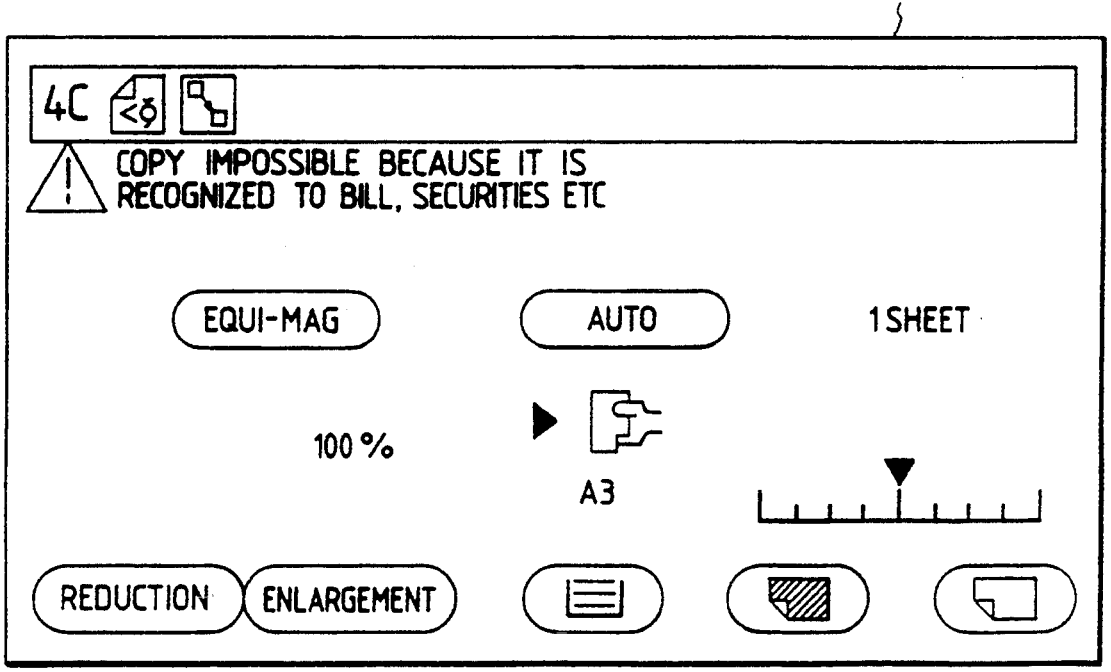
FIG. 11 is a plan view which illustrates an example of an indication displayed on the display frame when it is determined that the subject document is inhibited from being copied according to the first embodiment of the present invention.

In the comparison made by the comparison circuit 32, value L obtained from following Equation (6) is used similarly to the above-described description:

$$L = \sum_{i=1}^{n} \sum_{j=1}^{m} y_{ij}' Y_{(p+i)(q+j)} \quad (6)$$

where
i, j: pixel number
n, m: the number of pixels in the reference patterned data
p, q: the number of shiftings
y'ij: patterned reference data at (i, j) when rotated by angle θ
Yij: patterned original data at (i, j)
If the value obtained from the comparison holds the following relationship:

$$L > L_{th} \quad (7)$$

it is determined that patterned original data contains the same pattern as the reference pattern so that a control signal causing copying to be inhibited is transmitted to the CPU 22 through the signal line 34. When the CPU 22 receives this copy inhibition control signal, it stops the copying action, and displays a message shown in FIG. 11 on the operation panel 20 so that the copy inhibition is notified to the user.

On the other hand, if the value L obtained from the comparison conducted from the calculations expressed by Equation (6) holds the following relationship:

$$L \leq Lth$$

angle $\theta$ is changed by $\theta + \Delta\theta$ (where $\Delta\theta$ represents a small angle) and value L is again obtained from the comparison conducted in the same calculations described above. Then, the same control as described above is conducted.

As described above, if value L obtained from the comparison holds the following relationship when angle $\theta$ obtained by Equation (5) reaches 360° in the rotary processing circuit 30:

$$L \leq Lth$$

The comparison circuit 32 determines that the patterned original data does not include the pattern similar to the reference pattern data so that a usual copying action is caused to be conducted through the CPU 22.

As described above and according to the first and second embodiments, an area of an original which is desired by a user to be inhibited from being copied is freely instructed by the area appointing means. In accordance with the registration instruction, data about the instructed area is read, and is converted into patterned data by data conversion means. Then, data thus converted is registered in the memory means as reference data so as to be subjected to a comparison with readout pattern data obtainable from the data conversion means at the time of usual image forming. If it is determined that the original includes the same pattern as that in the reference data, the image forming processing is automatically stopped by the control means. As a result of the arrangement thus constituted, the copy of important paper such as secret documents which are desired by a user to be inhibited from being copied can be readily and reliably inhibited. Furthermore, according to this embodiment, reference patterns of bank bills, securities, and the like can be registered in the memory at the delivery from a manufacturing plant by arranging the above-described memory means to be a memory which cannot be deleted. As a result, forging of bank bills, securities, or the like can be effectively prevented.

Although the structure is constituted in such a manner that image forming is stopped when a specific original is detected, another structure may be employed which is arranged such that the contents of the image forming processing is caused to be different from that for a usual original with the image forming operation continued. For example, if it is determined to be a copy-inhibited original, a sole black image may be outputted. Alternatively, another mono-color image may be outputted. Furthermore, a full black image may be formed in a portion or over entire surface of the image area. These processing can be conducted by causing BK (black) data inputted by the control means E shown in FIG. 1 to the printer in accordance with the output from the comparison means D shown in FIG. 1 to be always "1", or by causing all of M (magenta), Y (yellow), and C (cyan) data to be "1".

<Third embodiment>

The image processing apparatus according to this embodiment is characterized in that means capable of updating, adding, and deleting reference data is further provided in addition to the structure according to the above-described embodiment.

Figure 12:
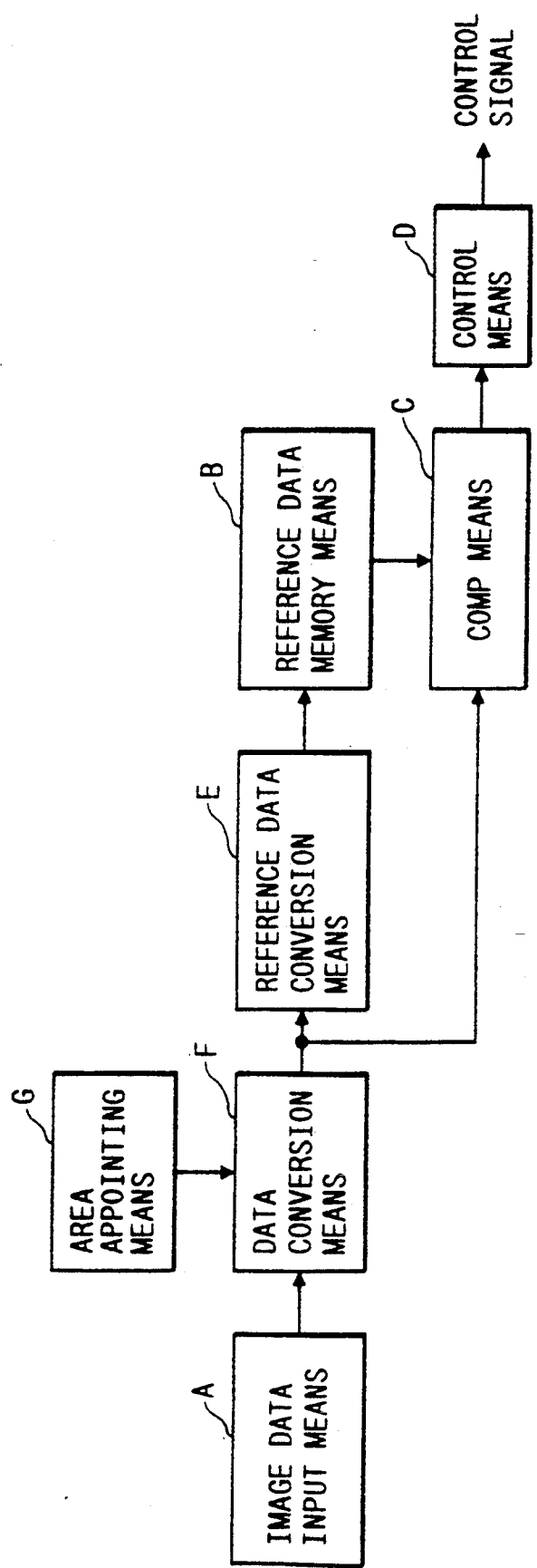
FIG. 12 is a block diagram which illustrates the basic structure of a third embodiment of the present invention.

FIG. 12 is a block diagram which illustrates the overall structure of the image processing apparatus according to this embodiment.

Referring to FIG. 12, symbol A represents an image data input means, B represents reference data memory means capable of storing reference data, C represents comparison means capable of making comparison between inputted data and reference data stored in the reference data memory means B, D represents control means capable of outputting copy inhibition signal as a control signal in accordance with the result of the comparison made by the comparison means C, and E represents reference data change means capable of adding, changing, and deleting reference data. Symbol F represents data conversion means capable of converting image data inputted by the input means A, and G represents area appointing means capable of appointing a predetermined area for the inputted image.

The schematic internal structure of the image processing apparatus according to this embodiment is similar to the structure shown in FIG. 2 and also the operation panel is similarly constituted to that shown in FIG. 3. Therefore, description abut these structures is omitted here.

FIG. 13 is a view which illustrates the appearance of the digitizer 16 serving as an example of the area appointing apparatus. Referring to FIG. 4, reference numeral 422 represents a zoom key, 423 represents a shift key, 424 represents an area appointing key, 425 represents a color create key, 426 represents an enlargement copy key, 427 represents an insertion synthesizing key, 428 represents an image change registration key. The keys 422, 423, 424, 425, 426, 427, and 428 are entry keys for use to instruct a mode. Reference numeral 420 represents a coordinate detection plate (coordinate position detection plate) capable of appointing an optional area on an original or of instructing a magnification. Reference numeral 421 represents a point pen with which a coordinate on the coordinate detection plate 420 is instructed. Information about the keys 422 to 428 and the coordinate detection plate 420, and coordinate input information are stored in the RAM (Random Access Memory) in the control unit 13 by the CPU (microcomputer) in the control unit 13 via the bus 505 shown in FIG. 2.

Since the former 6 modes realized by these keys are not directly related to the present invention, detailed description is omitted here.

Then, the operation of this embodiment will be described in such a manner that the reference data change means E is in major described with reference to FIGS. 1 to 11.

First, the handling will be described. As described above, when a document which is inhibited from being copied is tried to be copied, a message shown in FIG. 5 is indicated as described above. In this case, it is determined that data about a certain area in a document tried to be copied is the same as reference data previously stored in the reference data memory means B as a result of comparison made by the comparison means C. As a result, a copy inhibition signal is transmitted from the copy inhibiting means D.

Then, the procedure for adding, changing, and deleting the reference data stored in the reference data memory means B is shown in FIGS. 14A to 14K.

When user intends to change the reference data which has been previously registered, it is necessary for the user to depress the registered-image change switch 428. In this case, the display 405 of the liquid crystal touch panel of the operation panel 20 is replaced by a message shown in FIG. 14A.

Then, secret numbers, for example, "3356294", which are data to be read and inputted by the data input means A are inputted with the ten-key 404 as shown in FIG. 3 so as to be subjected to comparison with secret numbers which are previously stored in the RAMs 24 and 25 in the control unit 13. If they are not coincide with each other, the message is replaced by that shown in FIG. 14B. The secret numbers serve as an individual ID code for a person which is able to change the registered image. If nothing is inputted for a predetermined time period, a message shown in FIG. 14C is displayed on the display 405.

Figure 14A:
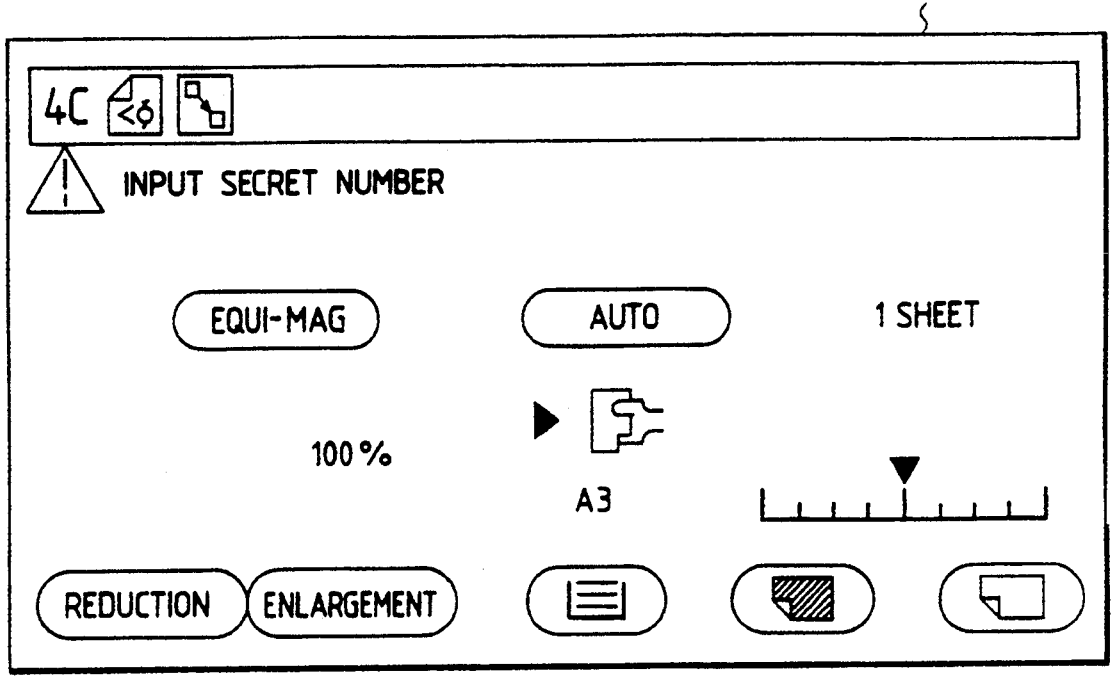
Figure 14B:
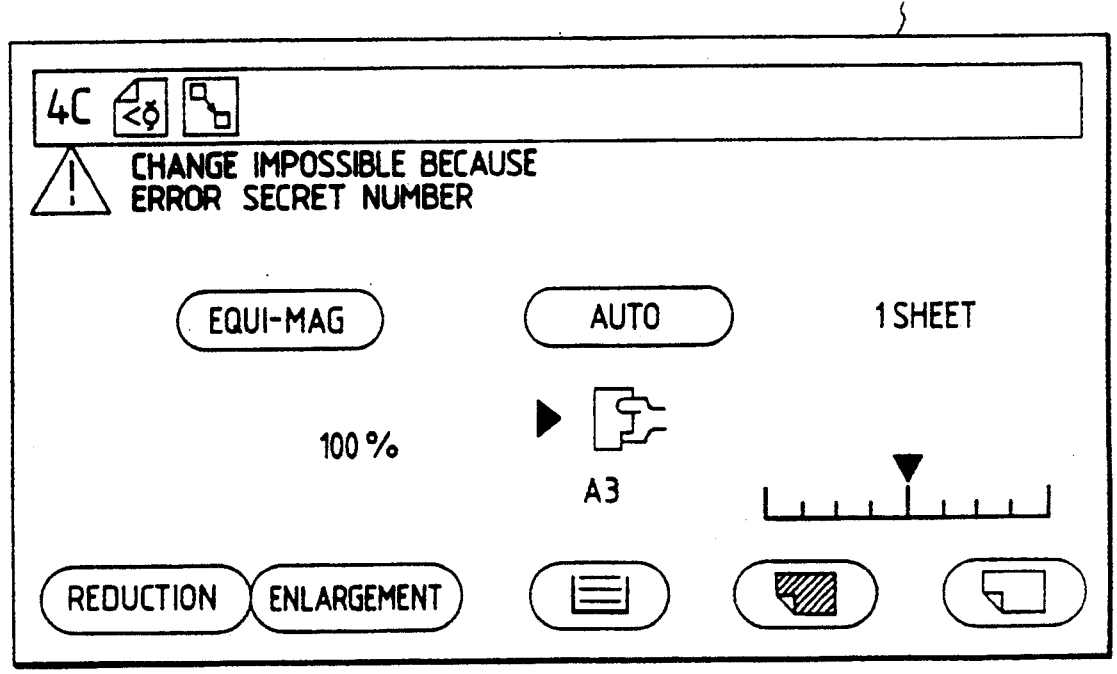
Figure 14E:
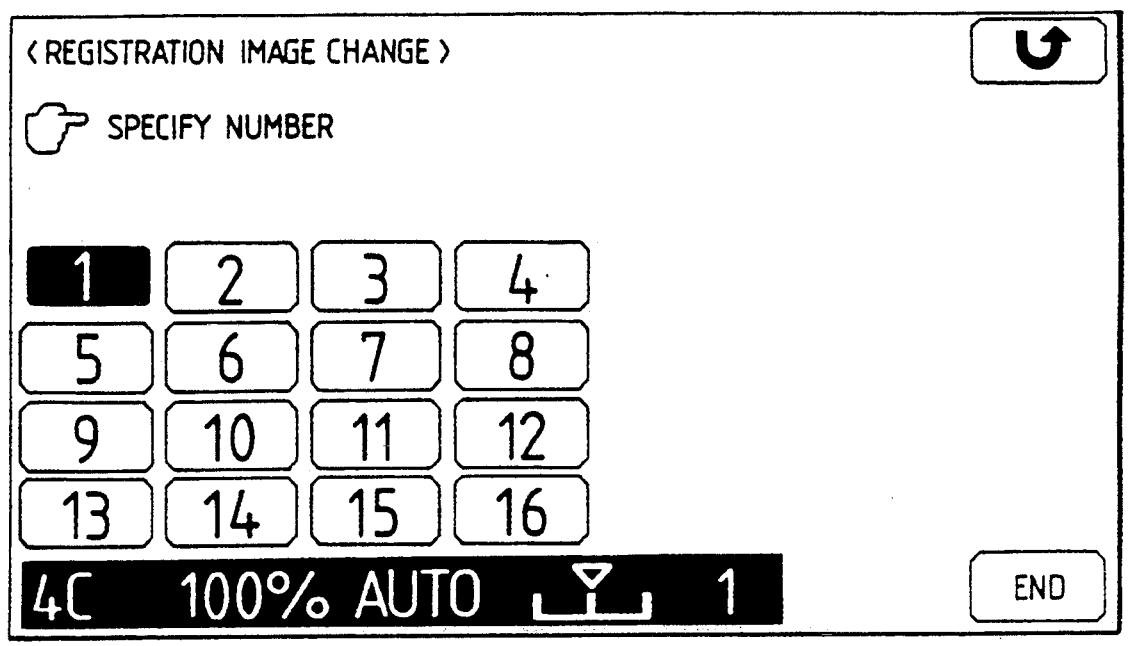
Figure 14F:
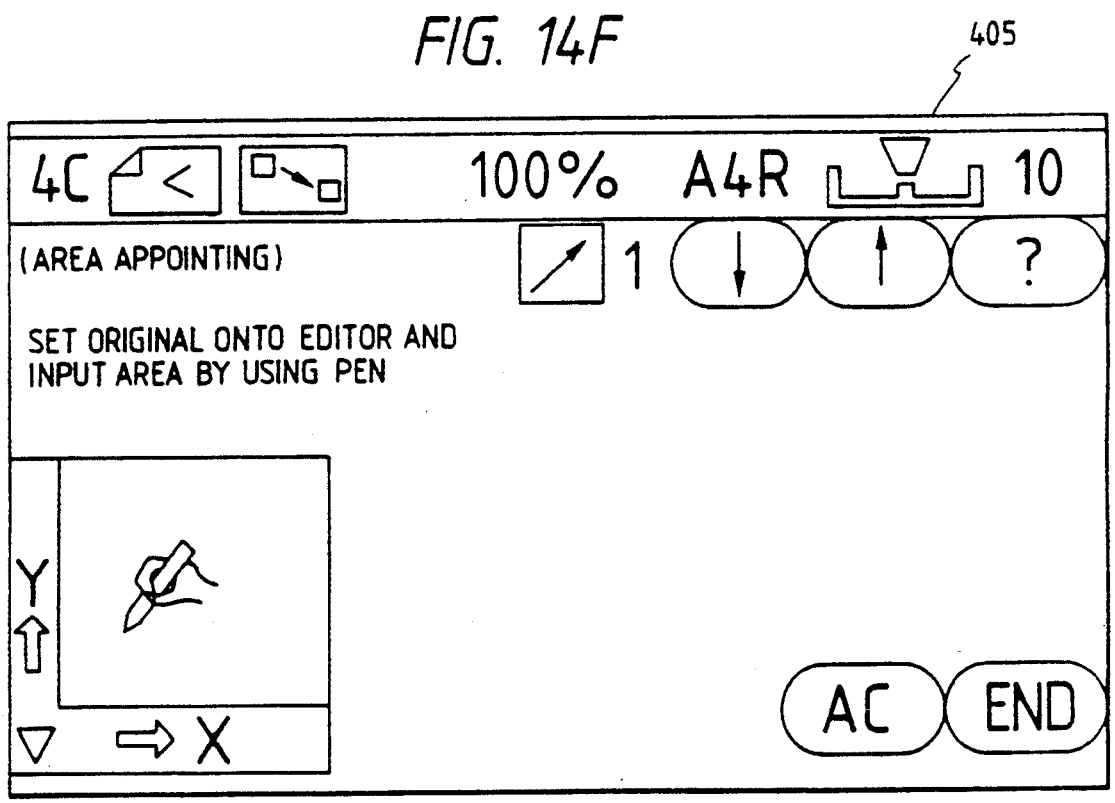

If the secret numbers inputted with the ten-key 404 and the secret numbers Which have been previously stored are the same, a message shown in FIG. 6D is displayed on the display 405. When the reference data is intended to be changed or added, the change registration key needs to be depressed. If it is intended to be deleted, the delete key 451 needs to be depressed. When the change-registration key 450 is depressed, a message as shown in FIG. 14E is displayed. Referring to FIG. 14E, a numeral $\boxed{1}$ is inversely displayed according to this embodiment, this indicating a fact that only the reference data in the No. 1 memory area is stored and registered. When the key $\boxed{1}$ is depressed, the No. 1 reference data is deleted, and input message shown in FIG. 14F corresponding to No. 1 reference data is displayed.

Figure 14G:
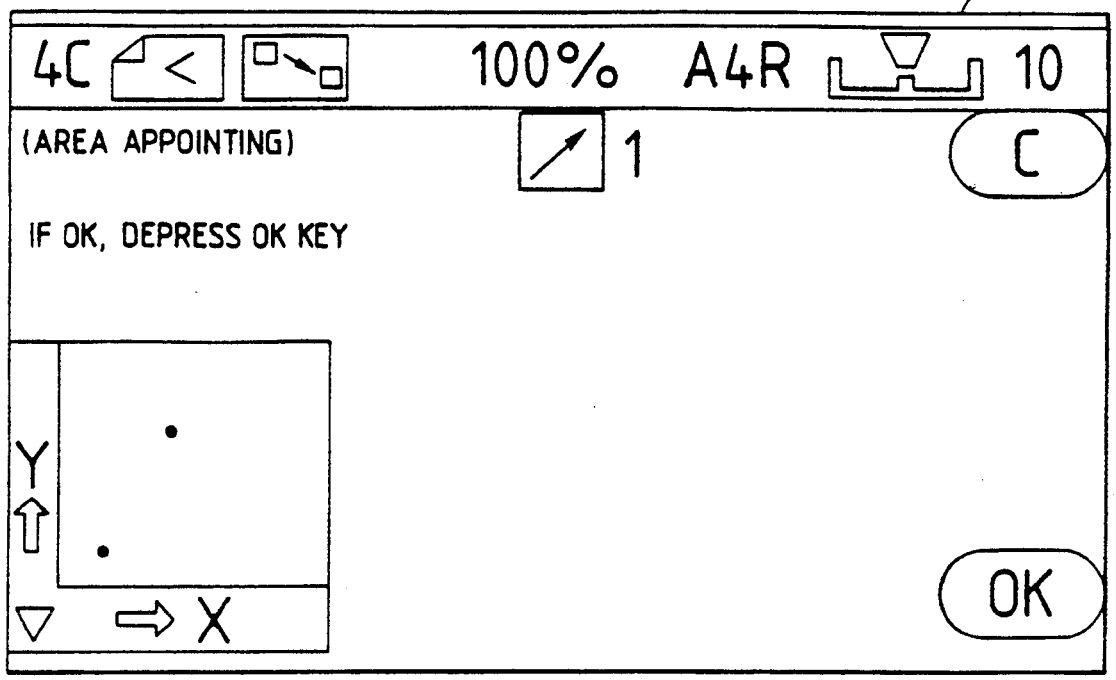
Figure 14H:
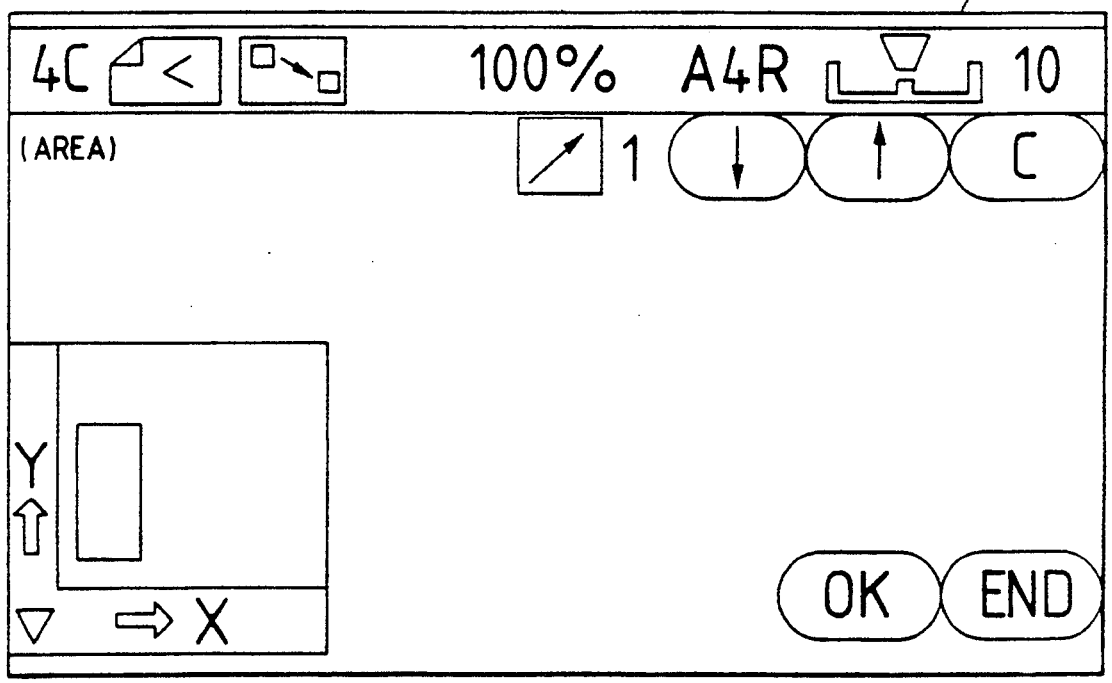
Figure 14I:
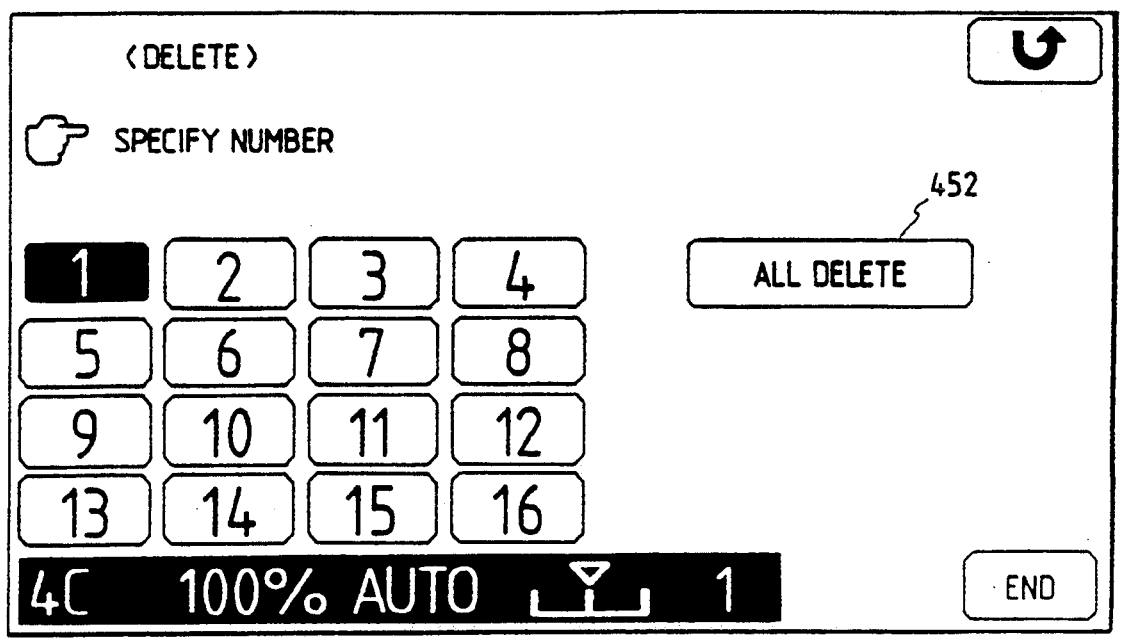
Figure 14J:
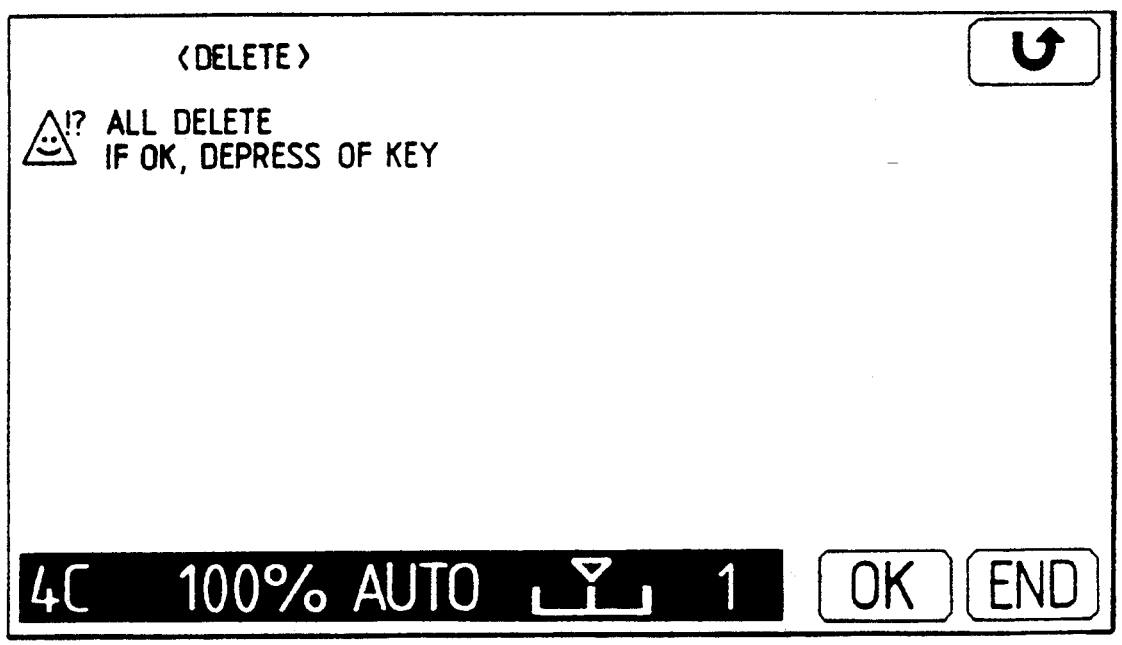
Figure 14K:
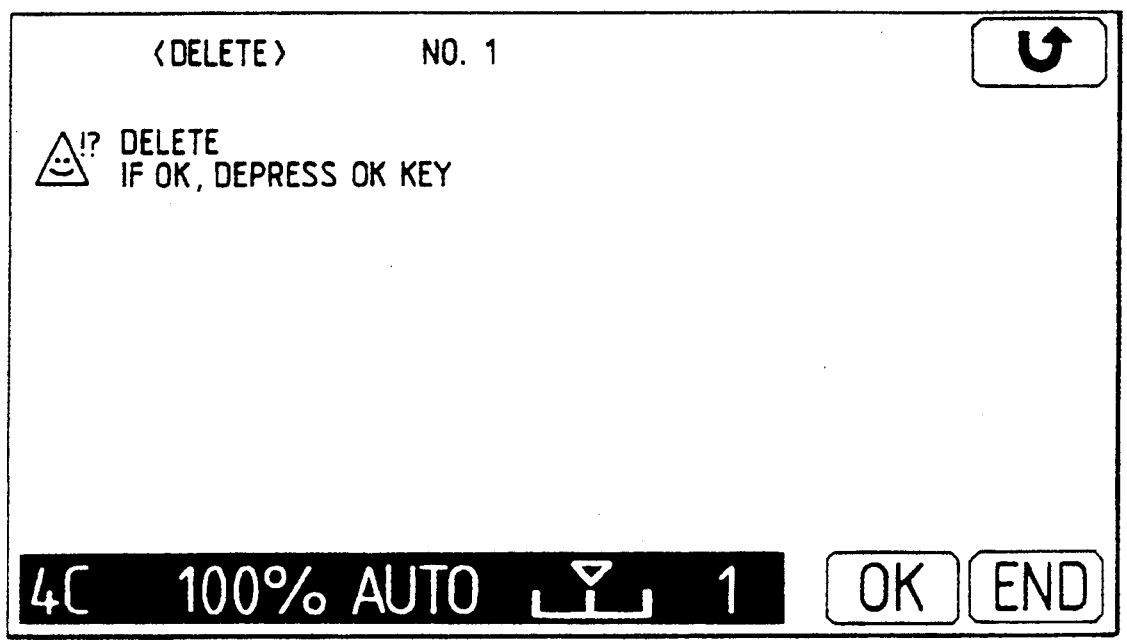

In accordance with the message displayed on the frame, the user needs to place the original on the coordinate detection plate (editor) 420 of the digitizer and to instruct and input an area with the point pen 421. As a result, a message as shown in FIG. 14G is displayed. When two points in the area are depressed, the display is replaced by a message shown in FIG. 14H. Then, a registration of reference data in accordance with an input of a novel copy-inhibited image is started by depressing the OK key. The registration of the reference data is conducted similarly to the registration in accordance with the above-described first embodiment. Thus, a novel reference data is, as No. 1 reference data, stored and registered by the reference data memory means shown in FIG. 12. When the delete key 451 shown in FIG. 14D is depressed, a message shown in FIG. 14I is displayed. Similarly to the above-described case, the inversely display of the No. 1 key indicates a fact that the reference data is stored and registered only in the No. 1 memory area. When the key $\boxed{1}$ is depressed, a message shown in FIG. 14K is displayed, and the No. 1 reference data is deleted by depressing the OK key. When full delete key 452 is depressed, a message shown in FIG. 14J is displayed, and all of the reference data is deleted by depressing the OK key.

Then, the structure and the operation of the control unit according to this embodiment and comprising the memory means B, the comparison means C, the copy inhibition means D, and the reference data change means E will be described with reference to FIG. 7.

Figure 15:
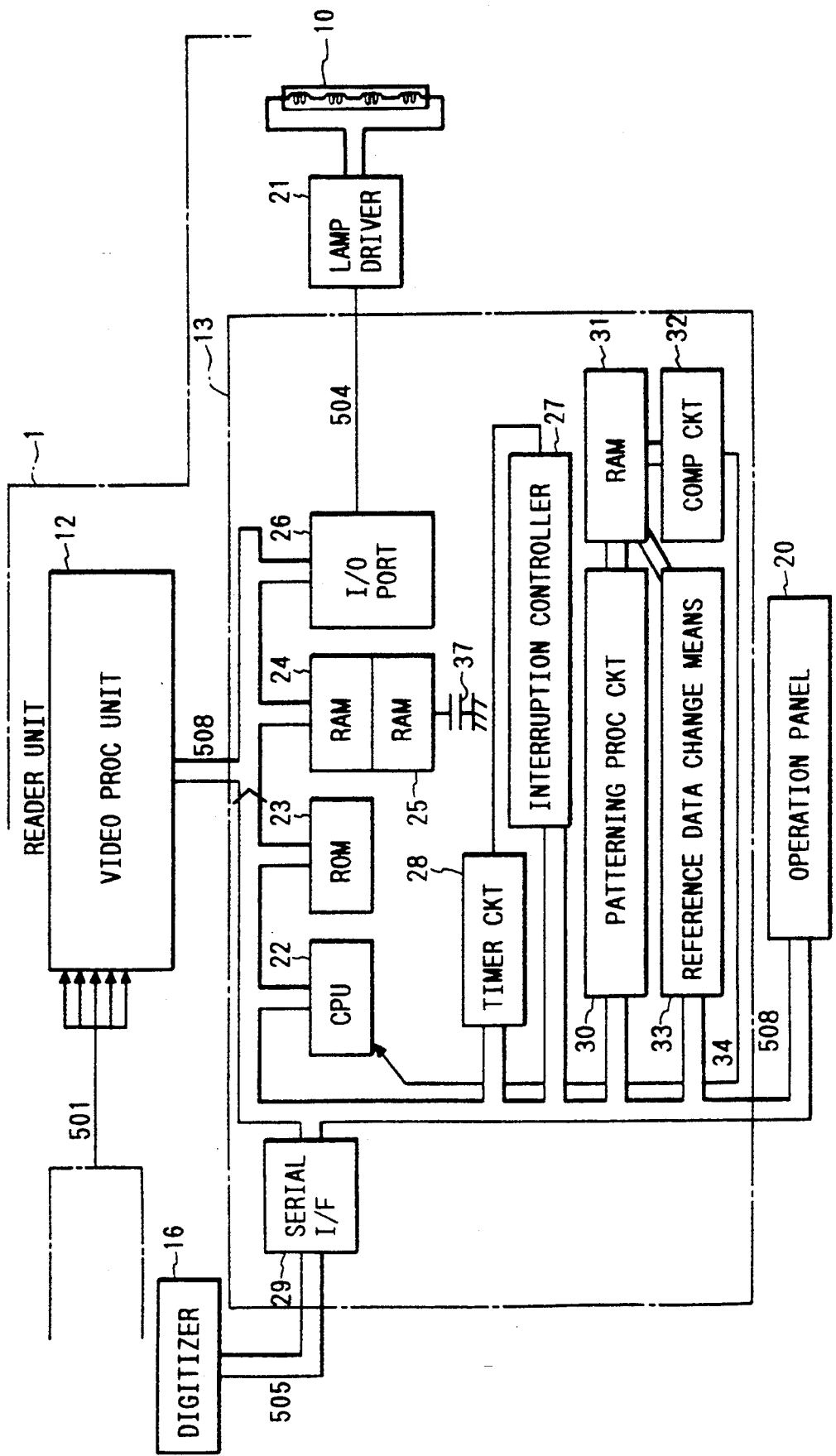
FIG. 15 is a block diagram which illustrates a circuit for use in a control unit.

FIG. 15 is a view which illustrates the structure of the circuit for use in the control unit 13 shown in FIG. 2.

Referring to FIG. 15, reference numeral 22 represents the CPU (Central Processing Unit), 23 represents the ROM (Read Only Memory) in which the control procedure and various constants are previously stored, 24 and 25 represent RAMs (Random Access Memory) to serve as working memories for the CPU 22. Reference numeral 26 represents an I/O (Input/Output port) through which a control signal is transmitted from the CPU 22 to the dimmer lamp driver 21 capable of actuating the halogen exposing lamp 10, 29 represents a serial interface (I/F) capable of transmitting and receiving data to and from the digitizer 16. Reference numeral 27 represents a interruption controller, and 28 represents a timer circuit. Reference numeral 30 represents a data input circuit capable of encoding data inputted as a code, 31 represents a registering RAM capable of storing reference data, and 33 represents reference data change means capable of controlling the RAM 31 in the case where a user intends to change the reference data. Reference numeral 32 represents a comparison circuit which serves as data comparison means C capable of making comparison between the encoded reference data in the RAM 31 and the encoded video signal so as to determine the correlation between the two data items. The control signal transmitted from the comparison circuit 32 and representing a fact that there is the correlation is supplied to the CPU 22 which serves as the copy inhibition control means D through the signal line 34. The above-described elements 22 to 33, the video processing unit 12, and the operation panel 20 are connected to one another through the bus 508.

Then, reference data additional, changing and deleting operations performed by the reference data change means 33 will be described.

Figure 16:
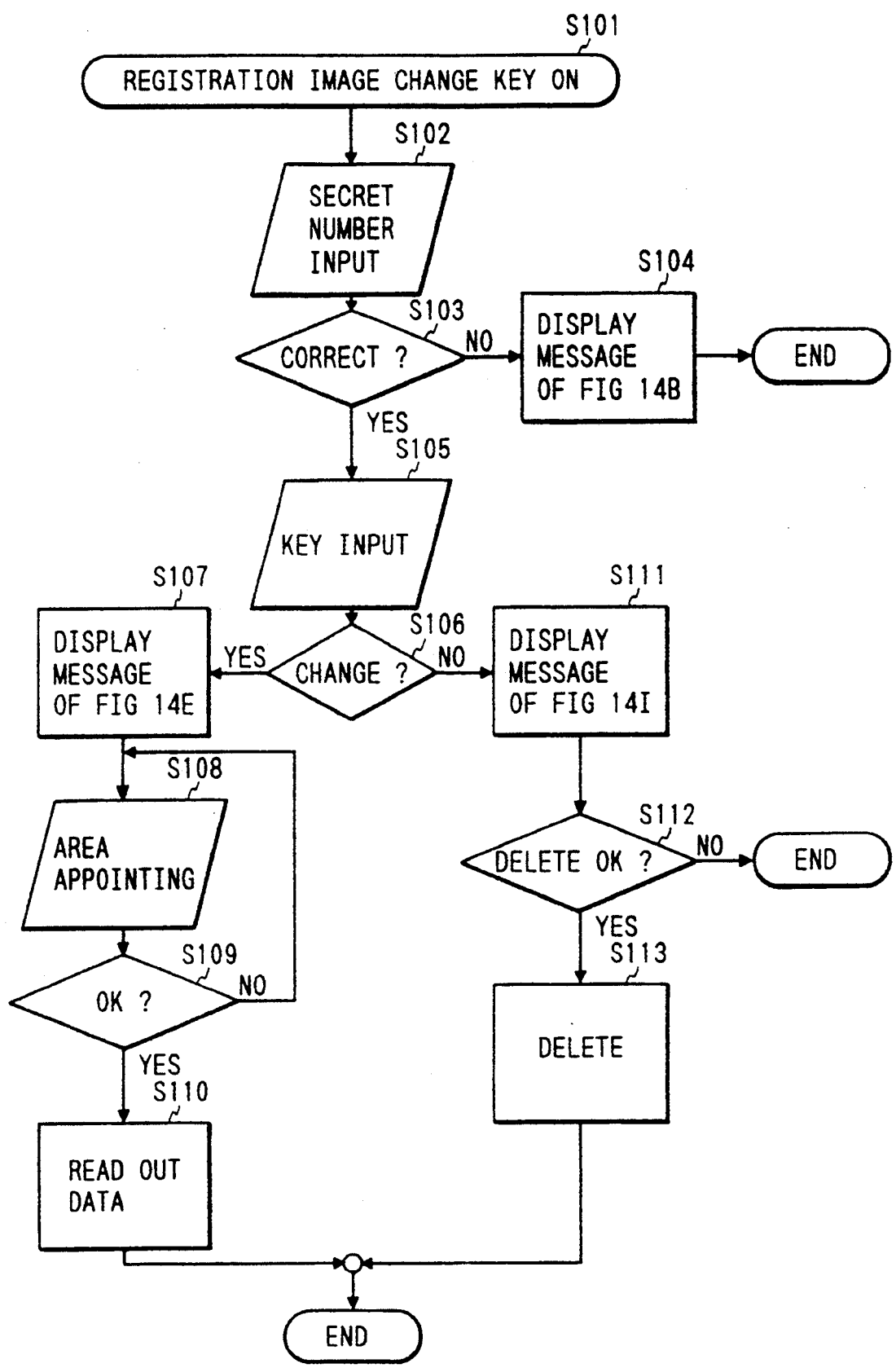
FIG. 16 is a flow chart corresponding to a registered image change mode.

In order to actuate the reference data change means 33, the registered area change key 428 shown in FIG. 13 is depressed. As a result, the message as shown in FIG. 14 is displayed, and a state in which a code is waited is realized. Then, the operations will be described with reference to a flow chart shown in FIG. 16. When a certain code is inputted through the ten-key 404 shown in FIG. 3 (S102), it is determined that the code thus inputted is the same as that which has been previously stored in the reference data change means 33 (S103). If it is determined that the two codes do not agree with each other, the flow advances to step S104 in which the message shown in FIG. 14B is displayed on the display 405, and the operation is completed. If it is determined that the inputted code and the stored code agree with each other, the message shown in FIG. 14D is displayed on the display 405 and a state in which a selection is waited is realized in step S105. When key input is conducted, it is determined whether the thus depressed key is to be changed or to be deleted (S106). If it is determined that the thus depressed key is to be changed, the message shown in FIG. 14E is displayed on the display 405 (S107), and a state in which input of numerals is waited is realized. The fact that the key $\boxed{1}$ is inversely indicated shows a fact that a reference data has been registered in the No. 1 memory area and also shows a fact that nothing is registered in the No. 2 to No. 16 memory areas. When No. 1 is instructed, the reference data registered in the No. 1 memory area is deleted and an operation for registering a novel reference data is started. When any of the No. 2 to No. 16 is instructed, an operation for registering a novel reference data is immediately started. As for the registration operations S108, S109, and S110, since they have been previously described in the first embodiment, detailed description are omitted here. Thus, a novel reference data is registered in the RAM 31.

If it is determined that the key input during the display of the message show in FIG. 14D on the display is instructing a key deletion, the flow advances to step S111 in which the message shown in FIG. 14I is displayed. The inverted indication of the key [1] shows the same fact as that described above. When the inputted key instructs a full deletion, the message shown in FIG. 14J is displayed, while when it is the No. 1 key, the message shown in FIG. 14H is displayed. Then, it is determined whether or not the OK key has been inputted in step S112. If it is determined that the end key is inputted, the operation is completed without conducting the deletion. If it is determined that the OK key has been inputted, the flow advances to step S113 in which the reference data registered in the RAM 31 is deleted in accordance with the demand issued from the reference data change means 33.

<Fourth embodiment>

Then, a modified example of the structure to the image forming apparatus according to this embodiment will be described with reference to FIGS. 17 and 18.

Figure 18:
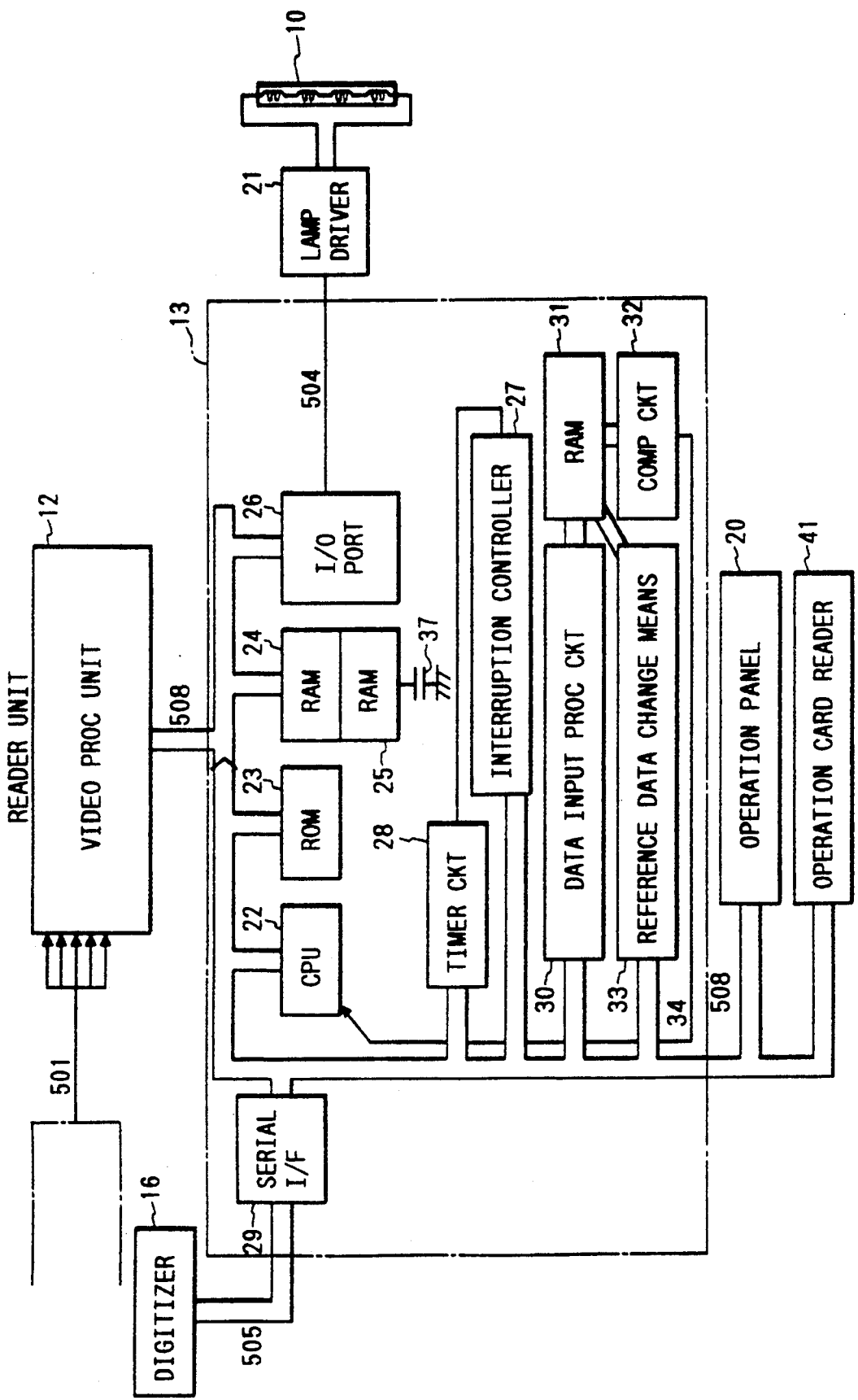
FIG. 18 is a block diagram which illustrates the structure of a circuit for use in a control unit according to the fourth embodiment of the present invention.

Referring to FIG. 18, the control unit 13 comprises the RAM 31 and an operation card reader 41. The other structures are similar to those shown in FIG. 7.

Figure 17A:
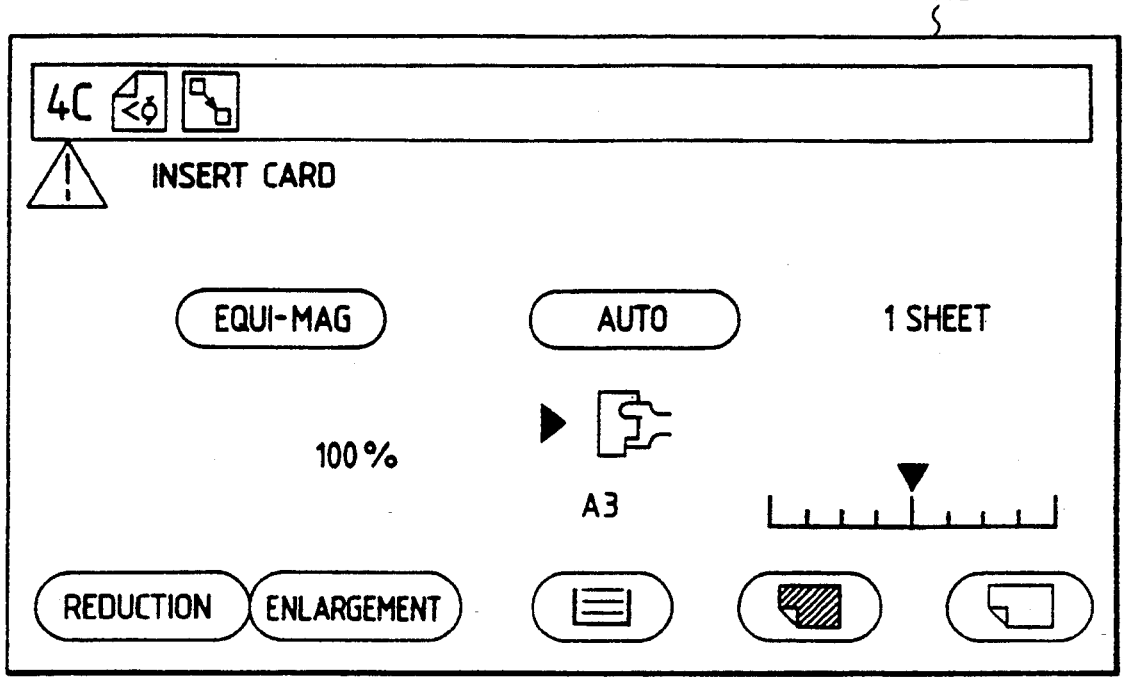
FIGS. 17A and 17B are views which illustrate an indication on the display according to a fourth embodiment.
Figure 20:
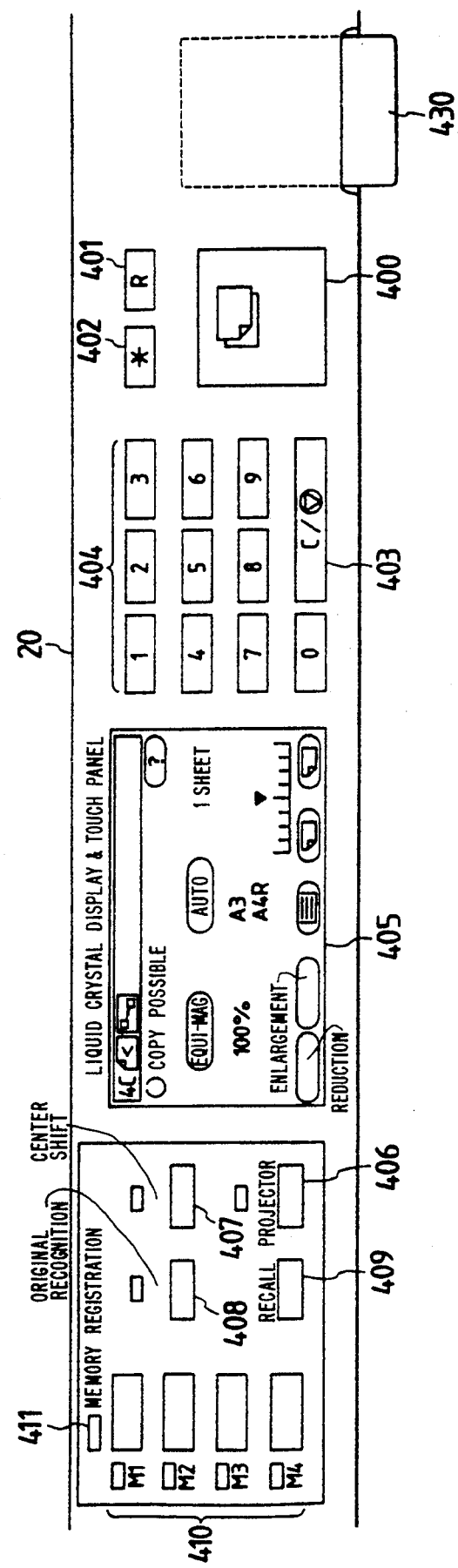
FIG. 20 is a plan view which illustrates the appearance of an operation panel having a card reader.

When the registered image change key 428 shown in FIG. 13 is depressed, a message shown in FIG. 17A is displayed on the display 405. FIG. 20 is a view which illustrates the appearance of the operation portion, where reference numerals 401 to 411 represent the same elements shown in FIG. 3. Reference numeral 430 represents an IC card in which a reference data is stored and which is illustrated in a state where it has been inserted.

Figure 17B:
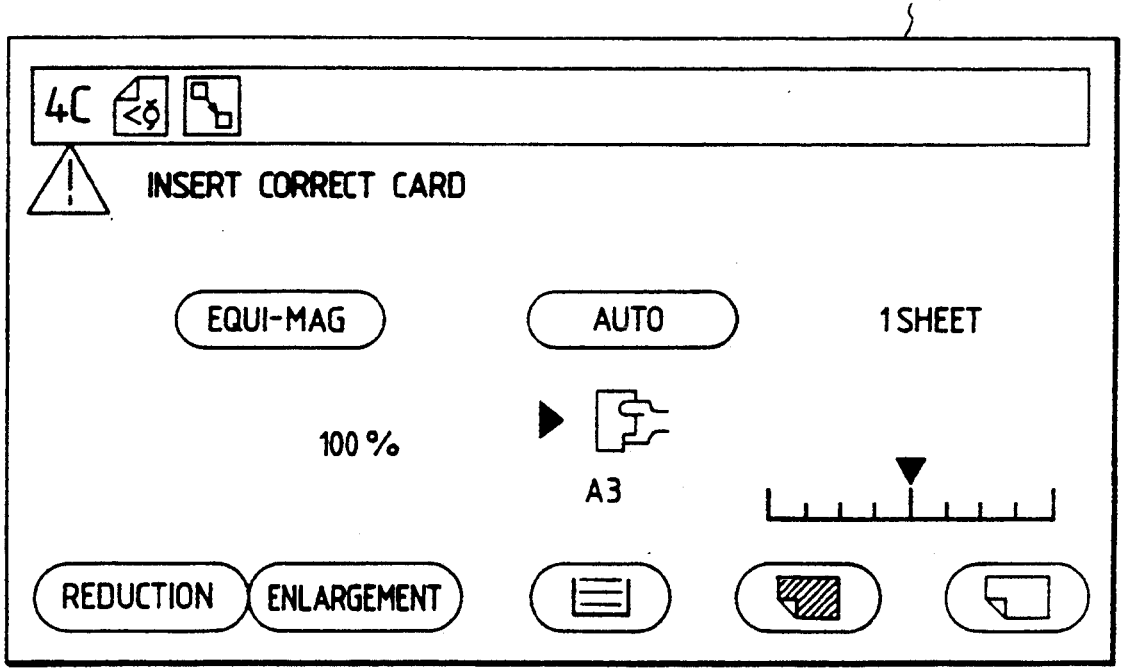

When a user inserts the IC card 430 in FIG. 20 into the operation card reader 41, it is determined whether or not the IC card 430 is a correct IC card. If it is determined that the IC card is a correct one, the reference data change means 33 transmits all of the reference data stored in the IC card 430 to the RAM 31. According to this modification, the reference data which meets the desired state can be registered in the IC card 430. Therefore, the change or deletion of the registered reference data cannot be conducted easily by strictly controlling (or managing) the use of the IC card. Since the operation for determining whether the subject document is the copy-inhibited one or not with reference to the reference data registered in the RAM 31 is conducted similar to that according to the previous embodiments, description is omitted here. If an incorrect IC card is inserted, a message shown in FIG. 17B is displayed on the display 405, and a registration of a novel reference data is inhibited.

Figure 19:
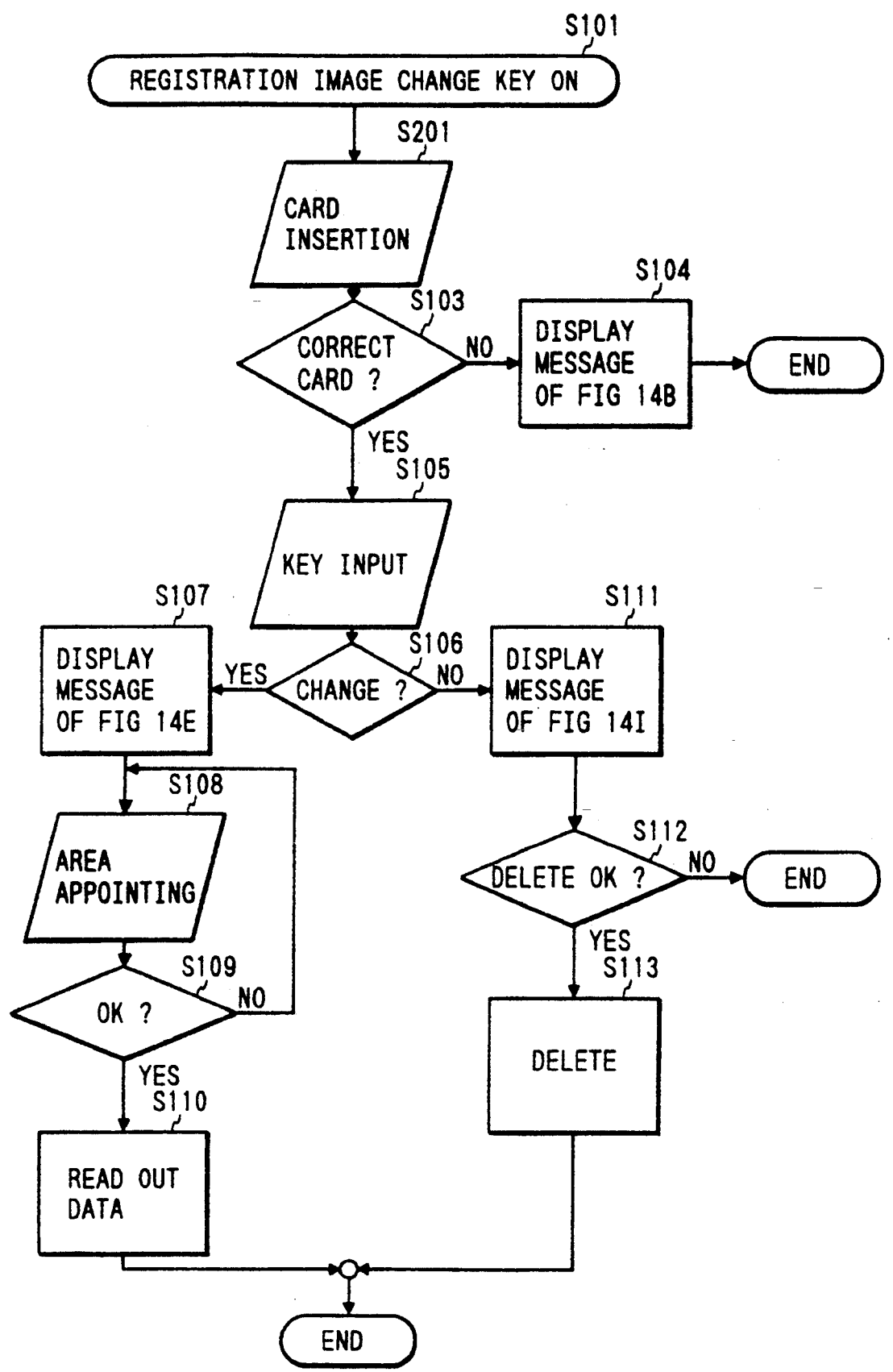
FIG. 19 is a flow chart corresponding to a registered change mode.

Although the IC card is used to serve as a medium in which the reference data is stored, it may be used as an IC card permitting the change, addition, and deletion of the reference data as an alternative to the code according to the third embodiment. A flow chart corresponding to this case is shown in FIG. 19. The difference from the flow chart shown in FIG. 16 lies in step S102. Since the other steps are the same as those shown in FIG. 16, description is omitted here.

As described above and according to the third and fourth embodiments of the present invention, in order to prevent easy updating, addition, and deletion of the reference data which is arranged to act to determine whether or not the copy is inhibited, a various means and structures are employed such that a code (or a secret number) is used, a reference data is registered by using a card in which the reference data has been previously stored, or updating, addition, and deletion of the reference data are permitted by means of the card. Therefore, an excellent satisfactory effect of preventing an excessive increase in the quantity of the copy-inhibited documents can be obtained. Furthermore, another satisfactory effect in that copy inhibition cannot be easily cancelled can be obtained.

Although the liquid crystal touch panel is, according to the above-described embodiments, used to instruct the numerals for the purpose of changing the reference image, it can be conducted by usual keys.

A portion of the reference data may be stored in a ROM so as to be rewritten as an alternative to the above-described arrangement in which a plurality of reference data items can be rewritten. In particular, if the structure is arranged such that only additional operation of the reference data concerning bank bills is permitted, forgery of old bank bills can be prevented.

Although the digitizer is used to appoint an area according to the above-described embodiments, the ten-key 404 may be used to appoint it by way of inputting coordinates.

The pattern data to be stored may be that converted into multivalued data as an alternative to the binary data according to the above-described embodiments. The memory means may be made of a magnetic recording medium such as a floppy disc as an alternative to the RAM according to the above-described embodiments.

The image processing may be changed so as to correspond to the similarity determined from comparison between the reference data and the input image data (for example, the proportion of coincidence) as an alternative to agreement of the two data items according to the above-described embodiments.

According to the above-described embodiments, the control is conducted by the control means when it is determined that the input image is a predetermined image which must be inhibited from being forged such that the image forming operation is stopped or cancelled, a mono-color image is outputted, or a full black image is outputted. However, it may be optionally arranged if a faithful reproduction of the image can be prevented, for example, a special processing such as realizing a mirror image or color changing may be employed, or the formed input image may be scrapped.

The means for permitting the change in the reference data acting to inhibit a forgery may be any means if it is capable of specifying a person enabling the rewriting of the reference data for example, an ID card (for example, an optical card, a magnetic card, and an IC card), or a code input means (for example, a ten-key).

According to the above-described embodiment, although the color laser beam printer is employed as a printer for outputting an image, the printer is not limited to this description. For example, a color thermal printer, a color ink-jet printer, a color dot printer, or the like may be employed.

As many apparently widely different embodiments of this invention may be made without departing from the spirit and scope thereof, it is to be understood that the invention is not limited to the specific embodiments thereof except as defined in the appended claims.

I claim:

1. An image processing apparatus comprising:

(a) input means for inputting image data, the image data comprising at least one of first image data and second image data;

(b) memory means for storing reference data in accordance with the first image data input by said input means;

(c) determination means for determining if an original represented by the second image data input by said input means has a predetermined visual pattern on the basis of the reference data stored in said memory means;

(d) mode setting means for setting a first mode in which the first image data is stored in said memory means as the reference data for the determination by said determination means and a second mode in which the determination by said determination means is performed by using the second image data input by said input means and the reference data stored in said memory means;

(e) discrimination means for discriminating whether an operator is permitted to set the first mode by said mode setting means in order to limit a person who can make said memory means store the first image data as the reference data; and (f) control means for controlling the mode setting by said mode setting means in accordance with the discrimination result by said discrimination means.

2. An image processing apparatus according to claim 1, further comprising:

(f) area appointing means for appointing an area of an original image represented by said first image data input by said input means;

wherein said memory means stores appointed image data of the area appointed by said area appointing means.

3. An image processing apparatus according to claim 1, further comprising:

(g) conversion means for converting the input image data inputted by said input means into pattern data;

wherein said memory means stores the pattern data converted by said conversion means.

4. An image processing apparatus according to claim 3, wherein the pattern comprises binary data.

5. An image processing apparatus according to claim 1, wherein said determination means comprises comparison means for making a comparison between the second image data input by said input means and the reference data stored in said memory means.

6. An image processing apparatus according to claim 5, wherein said control means controls to stop image forming processing in accordance with an output from said determination means.

7. An image processing apparatus according to claim 5, further comprising control means for changing image forming processing in accordance with an output from said determination means.

8. An image processing apparatus according to claim 7, wherein the change in the image forming processing comprises solely a black color output.

9. An image processing apparatus according to claim 1, wherein said input means comprises an image reading apparatus including a CCD sensor.

10. An image processing apparatus according to claim 1, further comprising:

(h) change means for changing the reference data stored in said memory means.

11. An image processing apparatus according to claim 10, wherein said change means comprises permitting means for permitting a specific person to rewrite the reference data.

12. An image processing apparatus according to claim 11, wherein said permitting means permits the writing in accordance with an identification card.

13. An image processing apparatus according to claim 11, wherein said permitting means permits the rewriting in accordance with an code input.

14. An image processing apparatus according to claim 1, wherein said image processing apparatus comprises electronic photography processing.

15. An image processing apparatus according to claim 1, wherein said memory means comprises a random access memory (RAM).

16. An image processing apparatus for inhibiting accurate reproduction of an input image when the input image is determined to be an original having a predetermined visual pattern, comprising:

(a) memory means for storing first reference data for inhibiting the accurate reproduction, the first reference data being related to a first kind of original;

(b) selectively operable writing means for writing second reference data into said memory means, the second reference data being related to a second kind of original different from the first kind of original;

(c) discrimination means for discriminating whether an operator is permitted to selectively operate said writing means in order to limit a person who can make said memory means store the first reference data; and (d) control means for controlling the writing means in accordance with the discrimination result by said discrimination means.

17. An image processing apparatus according to claim 16, further comprising:

(c) input means for inputting image data, wherein the second reference data written by said writing means is inputted by said input means.

18. An image processing apparatus according to claim 17, further comprising mode setting means for setting a mode in which writing is performed by said writing means.

19. An image processing apparatus according to claim 17, further comprising:

(d) conversion means for converting the image data inputted by said input means into pattern data;

wherein said memory means stores the pattern data converted by said conversion means.

20. An image processing apparatus according to claim 17, further comprising:

(e) comparison means for comparing the image data input by said input means at the time of a predetermined image forming operation and the reference data stored in said memory means.

21. An image processing apparatus according to claim 20, wherein said apparatus controls to stop the image forming processing in accordance with an output from said comparison means.

22. An image processing apparatus according to claim 20, wherein said apparatus changes image forming processing in accordance with an output from said comparison means.

23. An image processing apparatus according to claim 22, wherein said change in said image forming processing is to employ a sole black color output.

24. An image processing apparatus according to claim 18, wherein said mode setting means comprises permitting means for permitting a specific person to rewrite the reference data.

25. An image processing apparatus according to claim 24, wherein said mode setting means sets the mode on the basis of an ID card.

26. An image processing apparatus according to claim 24, wherein said mode setting means sets the mode on the basis of a code input.

27. An image processing apparatus comprising:
(a) input means for inputting image data, the image data comprising at least one of first image data and second image data;
(b) memory means for storing reference data in accordance with the first image data input by said input means;
(c) process means for processing the second image data and generating reproduction data for image forming;
(d) determination means for determining if an original represented by the second image data input by said input means has a predetermined pattern on the basis of the reference data stored in said memory means;
(e) first control means for controlling a condition of said image processing apparatus in accordance with the determination of said determination means;
(f) mode setting means for setting a first mode in which the first image data is stored in said memory means as the reference data for the determination by said determination means and a second mode in which the determination by said determination means is performed by using the second-image data input by said input means and the reference data stored in said memory means;
(g) discrimination means for discriminating whether an operator is permitted to set the first mode by said mode setting means in order to limit a person who can make said memory means store the first image data as the reference data; and
(h) second control means for controlling the mode setting by said mode setting means in accordance with the discrimination results by said discriminating means.

28. An image processing apparatus according to claim 27, further comprising:
(g) area appointing means for appointing an area for the input image data input by said input means;
wherein said memory means stores appointed image data of the area appointed by said area appointing means.

29. An image processing apparatus according to claim 27, further comprising:
(h) conversion means for converting the input image data input by said input means into pattern data;
wherein said memory means stores the pattern data converted by said conversion means.

30. An image processing apparatus according to claim 29, wherein the pattern data comprises binary data.

31. An image processing apparatus according to claim 27,
wherein said determination means comprises comparison means for making a comparison between the second image data input by said input means at the time of a predetermined image forming operation and the reference data stored in the memory means.

32. An image processing apparatus according to claim 31, wherein said first control means controls to stop the image forming processing in accordance with an output from said determination means.

33. An image processing apparatus according to claim 31, wherein said first control means changes image forming processing in accordance with an output from said determination means.

34. An image processing apparatus according to claim 33, wherein said change in said image forming processing is to employ a sole black color output.

35. An image processing apparatus according to claim 27, wherein said mode setting means comprises permitting means for permitting a specific person can rewrite the reference data.

36. An image processing apparatus according to claim 35, wherein said permission of change is conducted by using an ID card.

37. An image processing apparatus according to claim 35, wherein said permission of change is conducted by using code input.

38. A method for changing reference data for inhibiting an accurate reproduction of an input image by a copying apparatus on the basis of comparison between reference data, the reference data comprising at least one of first and second reference data, and input image data, comprising the steps of:
(a) discriminating whether an operator is permitted to change the reference data in order to limit a person who can change the reference data;
(b) setting the apparatus in a condition for changing the reference data in accordance with the discrimination result of said discrimination step;
(c) canceling the first reference data which have been used for comparison and which are related to a first kind of original; and
(d) setting second reference data to the apparatus, the second reference data being related to a second kind of original different from the first kind of original.

39. A method according to claim 38, wherein the reference data is input by image reading means.

40. A method according to claim 38, wherein the reference data comprises predetermined pattern data.

41. A method according to claim 38, wherein the condition for changing the reference data is set by an operation panel.

42. A method according to claim 38, wherein the reference data is input by image reading means and then stored into a memory.

43. A method according to claim 38, wherein the reference data comprises a predetermined pattern data.

44. A method for changing reference data for inhibiting an accurate output of an input image by an image processing apparatus on the basis of comparison between reference data stored in a memory and input image data, comprising the steps of:
(a) discriminating whether an operator is permitted to change the reference data stored in the memory in order to limit a person who can change the reference data; and
(b) changing the reference data stored in the memory in accordance with the discrimination result of said discrimination step.

45. A method according to claim 44, wherein the reference data is input by image reading means.

46. A method according to claim 44, wherein the reference data comprises predetermined visual pattern data.

47. A method according to claim 44, wherein the condition for changing the reference data is set by an operation panel.

48. An image processing apparatus for inhibiting accurate output of an input image when the input image is determined to be an original having a predetermined visual pattern, comprising:
  (a) input means for inputting image data representing the original;
  (b) area appointing means for appointing an area of the original; and
  (c) memory means for storing reference data for inhibiting the accurate output in accordance with the input image data within the area appointed by said area appointing means.

49. An apparatus according to claim 48, further comprising mode setting means for setting a mode in which storing of the reference data is performed.

50. An apparatus according to claim 48, further comprising:
  (d) conversion means for converting the image data input by said input means into pattern data, wherein said memory means stores the pattern data converted by said conversion means.

51. An apparatus according to claim 48, further comprising:
  (e) comparison means for comparing the image data input by said input means at the time of a predetermined image forming operation and the reference data stored in said memory means.

52. An apparatus according to claim 51, wherein said apparatus controls to stop the image forming processing in accordance with an output from said comparison means.

53. An apparatus according to claim 51, wherein said apparatus changes image forming processing in accordance with an output from said comparison means.

54. An apparatus according to claim 49, wherein said mode setting means comprises permitting means for permitting a specific person to rewrite the reference data.

55. An apparatus according to claim 54, wherein said mode setting means sets the mode on the basis of an ID card.

56. An apparatus according to claim 54, wherein said mode setting means sets the mode on the basis of a code input.

* * * * *

UNITED STATES PATENT AND TRADEMARK OFFICE
CERTIFICATE OF CORRECTION

PATENT NO. : 5,424,807　　　　　　　　　　　　　Page 1 of 5
DATED : June 13, 1995
INVENTOR(S) : Hiroshi Ohmura It is certified that error appears in the above-indentified patent and that said Letters Patent is hereby corrected as shown below:

On the title page item,
   [56] U.S. PATENT DOCUMENTS

After "4,588,286 5/1986 Stockburger ... 355/40" insert
--4,908,873 3/1990 Philibut et al. ... 355/201--, and then insert
--4,325,981 4/1982 Sugiura et al. ... 427.7--"
       After "4,723,149 2/1988 Harada ... 355/201" insert
--4,728,984 3/1988 Daniele ... 355/201--, and then insert
--4,739,377 4/1988 Allen ... 355/201--

At [56] FOREIGN PATENT DOCUMENTS

Insert --174783 7/1987 Japan--

At [56]

Insert --OTHER PUBLICATIONS

Guido, A.A., IBM Tech. Disc. Bulletin, "Preventing Copying of Classified Information," Vol. 19, No. 4, Sept. 1976, p. 1469-70.--

Column   1

Line 54, "an" should be deleted;
       Line 64, "data" should read --data,--;
       Line 65, "means the" should read --means for storing the--; and
       Line 66, "data means control" should read --data. Control means--.

UNITED STATES PATENT AND TRADEMARK OFFICE
CERTIFICATE OF CORRECTION

PATENT NO. : 5,424,807
DATED : June 13, 1995
INVENTOR(S) : Hiroshi Ohmura

It is certified that error appears in the above-indentified patent and that said Letters Patent is hereby corrected as shown below:

Column 2

Line 1, "result ," should read --a result,--;
    Line 19, "forgery control" should read --forgery. Control--;
    Line 23, "forged;" should read --forged,--
    Line 24, "capable of changing" should read --changes--;
    Line 34, "first-" should read --first--;
    Line 35, "/embodiment" should read --embodiment--
    Line 59, "preset" should read --present--;

Column 4

Line 51, "pollysystem" should read --pullysystem--.

Column 5

Line 37, "an" should read --a--.

Column 6

Line 16, "force of a" should be deleted;
    Line 17, "motor 747, which is mounted on a motor" should read --and 745--; and
    Line 19, "and" should read --and 745--.

Column 7

Line 5, "original, an" should read --original. An--;
    Line 10, "description" should read --descriptions--; and
    Line 11, "Herein, below" should read --Hereinbelow--.

UNITED STATES PATENT AND TRADEMARK OFFICE
CERTIFICATE OF CORRECTION

PATENT NO. : 5,424,807
DATED : June 13, 1995
INVENTOR(S) : Hiroshi Ohmura

It is certified that error appears in the above-indentified patent and that said Letters Patent is hereby corrected as shown below:

Column 8

Line 18, "30 the" should read --30 at the--; and
    Line 19, "mode" should read --mode,--, and "numeral," should read --numeral--.

Column 9

Line 40, "The" should read --the--, and "no" should read --not the--.

Column 10

Line 11, "YiJ:" should read --$Y_{ij}$:--;
    Line 13, "Y0, Y1, Y2:" should read --$Y_0$, $Y_1$, $Y_2$:--;
    Line 34, "following" should read --the following--; and
    Line 41, "following" should read --the following--.

Column 11

Line 18, "The" should read --the--; and
    Line 62, "(magenda)," should read --(magenta_,--.

Column 12

Line 25, "abut" should read --about--; and
    Line 29, "FIG. 4," should read --FIG. 13,--.

UNITED STATES PATENT AND TRADEMARK OFFICE
CERTIFICATE OF CORRECTION

PATENT NO. : 5,424,807
DATED : June 13, 1995
INVENTOR(S) : Hiroshi Ohmura

Page 4 of 5

It is certified that error appears in the above-indentified patent and that said Letters Patent is hereby corrected as shown below:

Column 13

Line 20, "Which" should read --which--; and
    Line 64, "FIG. 7." should read --FIG. 15.--.

Column 14

Line 11, "a" (first occurrence) should read --an--; and
    Line 68, "description" should read --descriptions--.

Column 16

Line 53, "data" should read --data,--.

Column 17

Line 30, "(f)" should read --(g)--;
    Line 65, "(h)" should read --(g)--.

Column 18

Line 8, "an" should read --a--;
    Line 37, "(c)" should read --(e)--;
    Line 46, "(d)" should read --(f)--;
    Line 52, "(e)" should read --(f)--; and
    Line 57, "the" should be deleted.

Column 19

Line 33, "second-image" should read --second image--;
    Line 48, "(g)" should read --(i)--; and
    Line 55, "(h)" should read --(i)--.

UNITED STATES PATENT AND TRADEMARK OFFICE
CERTIFICATE OF CORRECTION

PATENT NO. : 5,424,807

DATED : June 13, 1995

INVENTOR(S) : Hiroshi Ohmura

It is certified that error appears in the above-indentified patent and that said Letters Patent is hereby corrected as shown below:

Column 20

Line 14, "can" should read --to--;
Line 17, "permission of change" should read --permitting of change--; and
Line 20, "permission of change" should read --permitting of change--.

Signed and Sealed this

Twenty-eighth Day of November 1995

Attest:

BRUCE LEHMAN

*Attesting Officer*   *Commissioner of Patents and Trademarks*